United States Patent
Löhning et al.

(10) Patent No.: US 10,218,549 B1
(45) Date of Patent: Feb. 26, 2019

(54) WIRELESS RADIO RECEIVER THAT PERFORMS ADAPTIVE PHASE TRACKING

(71) Applicant: National Instruments Corporation, Austin, TX (US)

(72) Inventors: Michael Löhning, Dresden (DE); Eckhard Ohlmer, Dresden (DE)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 15/879,369

(22) Filed: Jan. 24, 2018

(51) Int. Cl.
*H04L 1/00* (2006.01)
*H04L 7/00* (2006.01)
*H04L 27/227* (2006.01)
*H04L 25/03* (2006.01)

(52) U.S. Cl.
CPC ............ *H04L 27/2278* (2013.01); *H04L 1/00* (2013.01); *H04L 7/00* (2013.01); *H04L 7/0012* (2013.01); *H04L 7/0029* (2013.01); *H04L 7/0087* (2013.01); *H04L 7/0091* (2013.01); *H04L 25/03057* (2013.01)

(58) Field of Classification Search
CPC combination set(s) only.
See application file for complete search history.

(56) References Cited

U.S. PATENT DOCUMENTS 5,666,378 A 9/1997 Marchetto et al.
5,832,040 A * 11/1998 Yamanaka .......... H04L 27/3827
375/326
6,178,194 B1 1/2001 Vasic
6,438,173 B1 8/2002 Stantchev
6,671,339 B1 * 12/2003 Ahn ........................ H03L 7/095
375/326
6,678,339 B1 1/2004 Lashkarian
(Continued)

OTHER PUBLICATIONS

White Paper. "*802.11ad—WLAN at 60 GHz A Technology Introduction.*" Rohde & Schwarz 1MA220_2e. Nov. 17, 2017 pp. 1-28.

(Continued)

*Primary Examiner* — Linda Wong
(74) *Attorney, Agent, or Firm* — E. Alan Davis; James W. Huffman

(57) ABSTRACT

A post-equalization phase tracking unit, for each signal block of a received series: computes beginning absolute phase rotation using equalized preceding pilot symbols; subdivides the block into a time sequence of groups of equalized symbols; initializes accumulated phase associated with the first-in-time group with the absolute phase rotation. For each group, the unit: computes a de-rotated version of each symbol using the previous group's accumulated phase used to blindly estimate a residual group phase; assigns the group's accumulated phase with a sum of the group's residual phase and the previous group's accumulated phase; estimates phase drift within the group by using at least the group's accumulated phase to compute a phase compensation signal. A pre-equalization phase tracking unit computes a phase of autocorrelation between identical-as-transmitted initial/terminal sequence portions; estimates a start phase using the autocorrelation phase and the previous signal block start phase; interpolates start phases to estimate phase drift.

21 Claims, 19 Drawing Sheets

(56) References Cited

U.S. PATENT DOCUMENTS

| | | | |
|---|---|---|---|
| 6,720,824 B2 | 4/2004 | Hyakudai et al. | |
| 6,861,979 B1* | 3/2005 | Zhodzishsky | G01S 19/23 342/357.29 |
| 7,027,540 B2 | 4/2006 | Wilson et al. | |
| 7,068,593 B2* | 6/2006 | Cho | H04L 25/0204 370/208 |
| 7,336,597 B2 | 2/2008 | Maltsev et al. | |
| 7,428,267 B2 | 9/2008 | Lee et al. | |
| 7,469,106 B2* | 12/2008 | Feced | H04B 10/2575 398/183 |
| 7,567,640 B2* | 7/2009 | Chen | H04L 27/2662 327/155 |
| 7,570,577 B2 | 8/2009 | Ishii | |
| 7,606,498 B1* | 10/2009 | Wu | H04B 10/60 398/152 |
| 8,116,367 B2* | 2/2012 | Carrer | H04L 25/03063 375/233 |
| 8,165,172 B2 | 4/2012 | Razazian et al. | |
| 8,170,170 B2* | 5/2012 | Matsumoto | H04L 27/0014 327/147 |
| 8,325,755 B2 | 12/2012 | Lee et al. | |
| 8,433,010 B2 | 4/2013 | Matsumura et al. | |
| 8,446,254 B2* | 5/2013 | Carrick | G01S 5/14 340/10.1 |
| 8,477,750 B2 | 7/2013 | Agarwal et al. | |
| 8,817,921 B2 | 8/2014 | Lee et al. | |
| 8,938,015 B2 | 1/2015 | Arambepola et al. | |
| 8,971,465 B2 | 3/2015 | Varanese et al. | |
| 9,160,382 B2 | 10/2015 | Wu et al. | |
| 9,191,161 B2 | 11/2015 | Li et al. | |
| 9,331,846 B2 | 5/2016 | Kusunoki | |
| 9,477,386 B2 | 10/2016 | Rao et al. | |
| 9,686,052 B2* | 6/2017 | Higashinaka | H04L 1/206 |
| 2003/0053559 A1* | 3/2003 | Chen | C30B 25/18 375/316 |
| 2003/0123595 A1* | 7/2003 | Linsky | H04L 1/0045 375/376 |
| 2004/0156309 A1* | 8/2004 | Chadha | H04L 27/2675 370/208 |
| 2004/0156349 A1* | 8/2004 | Borisovich | H03L 7/07 370/343 |
| 2005/0025257 A1* | 2/2005 | Goldstein | H04L 27/2657 375/316 |
| 2005/0129096 A1 | 6/2005 | Zhengdi et al. | |
| 2005/0147186 A1 | 7/2005 | Funamoto et al. | |
| 2005/0180760 A1* | 8/2005 | Feced | H04B 10/2575 398/183 |
| 2005/0185743 A1 | 8/2005 | Li | |
| 2006/0165158 A1* | 7/2006 | Richardson | H01Q 3/267 375/214 |
| 2006/0239181 A1 | 10/2006 | Hosur | |
| 2007/0036231 A1 | 2/2007 | Ido | |
| 2007/0086533 A1* | 4/2007 | Lindh | H04L 27/0014 375/260 |
| 2007/0133391 A1 | 6/2007 | Roh et al. | |
| 2008/0008268 A1* | 1/2008 | Koc | H04L 27/0014 375/329 |
| 2008/0056305 A1* | 3/2008 | Medvedev | H04L 1/0045 370/491 |
| 2008/0069252 A1* | 3/2008 | Wenzhen | H04L 27/2657 375/260 |
| 2008/0212662 A1* | 9/2008 | Lee | H03D 3/009 375/224 |
| 2008/0219340 A1* | 9/2008 | Saed | H04L 25/03159 375/231 |
| 2008/0232327 A1 | 9/2008 | Kuroyanagi et al. | |
| 2008/0232496 A1* | 9/2008 | Lin | H04L 27/2663 375/260 |
| 2008/0304607 A1 | 12/2008 | Birru | |
| 2009/0103633 A1* | 4/2009 | Zhang | H04L 27/22 375/240.26 |
| 2009/0190926 A1* | 7/2009 | Charlet | H04B 10/532 398/74 |
| 2009/0290654 A1* | 11/2009 | Yu | H04L 1/0041 375/267 |
| 2009/0303869 A1 | 12/2009 | Umari et al. | |
| 2009/0310722 A1* | 12/2009 | Lewis | H04L 27/2657 375/344 |
| 2010/0040129 A1* | 2/2010 | Kim | H04L 25/03114 375/232 |
| 2010/0075611 A1 | 3/2010 | Budampati et al. | |
| 2010/0118849 A1 | 5/2010 | Kimura | |
| 2010/0119013 A1 | 5/2010 | Liu et al. | |
| 2010/0177251 A1 | 7/2010 | Kimura et al. | |
| 2010/0283911 A1* | 11/2010 | Belotserkovsky | H04L 7/027 348/726 |
| 2010/0329677 A1 | 12/2010 | Kaneda et al. | |
| 2011/0007789 A1* | 1/2011 | Garmany | H04L 25/022 375/224 |
| 2011/0064175 A1* | 3/2011 | Leyonhjelm | H04L 27/2659 375/350 |
| 2011/0230154 A1* | 9/2011 | Jacobsen | H04L 25/03057 455/205 |
| 2012/0121040 A1* | 5/2012 | Yu | H04L 1/0041 375/296 |
| 2013/0259153 A1 | 10/2013 | Varanese et al. | |
| 2014/0126624 A1 | 5/2014 | Garmany | |
| 2014/0169429 A1 | 6/2014 | Ran | |
| 2014/0204992 A1* | 7/2014 | Jacobsen | H04L 25/03057 375/233 |
| 2014/0270001 A1* | 9/2014 | Schubert | H04L 1/0045 375/320 |
| 2014/0334530 A1 | 11/2014 | Thompson et al. | |
| 2015/0043629 A1 | 2/2015 | Thompson et al. | |
| 2015/0156036 A1* | 6/2015 | Genossar | H04L 25/0202 375/232 |
| 2015/0195081 A1 | 7/2015 | Matsumoto et al. | |
| 2015/0311986 A1* | 10/2015 | Thomas | H04B 17/345 375/230 |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2016/0072547 A1 | 3/2016 | Muqaibel et al. | |
| 2016/0323091 A1 | 11/2016 | Inoue | |
| 2017/0026203 A1* | 1/2017 | Thomas | H04B 17/345 |
| 2017/0085293 A1* | 3/2017 | Marrow | H04B 1/71637 |
| 2017/0290013 A1 | 10/2017 | McCoy et al. | |
| 2018/0062623 A1* | 3/2018 | Pagnanelli | H03M 3/414 |
| 2018/0076903 A1 | 3/2018 | Oyama et al. | |
| 2018/0131446 A1* | 5/2018 | Fan | H04B 10/516 |

OTHER PUBLICATIONS

Serpedin, Erchin et al. "*Performance Analysis of Blind Carrier Phase Estimators for General QAM Constellations.*" IEEE Transactions on Signal Processing, vol. 49, No. 8. Aug. 2001, pp. 1816-1823.

Moeneclaey, Marc et al. "*ML-Oriented NDS Carrier Synchronization for General Rotationally Symmetric Signal Constellations.*" IEEE Transactions on Communications, vol. 42, No. 8. Aug. 1994. pp. 2531-2533.

Thomas, Timothy A. et al. "*Blind Phase Noise Mitigation for a 72 GHz Millimeter Wave System.*" IEEE ICC 2015 SAC—Millimeter-wave Communications. 2015 pp. 1352-1357.

Vieira et al. "*Reciprocity Calibration Methods for Massive MIMO Based on Antenna Coupling.*" Department of Electrical Engineering, Lund University, 5 pp. Jan. 1, 2014.

Harris, "*University of Bristol and Lund University Partner with NI to Set World Records in 5G Wireless Spectral Efficiency Using Massive MIMO.*" 7 pp. May 2016.

"*LTE in a Nutshell—Physical Layer.*" Telesystem Innovations Inc. White Paper. 18 pp. 2010.

"*An Introduction to Orthogonal Frequency Division Multiplex Technology.*" Keithley Instruments, Inc. 66pp. 2008.

Huawei et al. "*WF on CSI Acquisition in NR*" 3GPP TSG RAB WGI Meeting #85, 4pp. May 27, 2016.

Huawei et al. "*WF on CSI Acquisition Framework in NR.*" 3GPP TSG RAN WGI Meeting #85, 3pp. May 27, 2016.

(56) References Cited

OTHER PUBLICATIONS

"*Study on Latency Reduction Techniques for LTE.*" 3GPP TR 36.881 Technical Report, 92pp. Feb. 2016.
"*Study on Scenarios and Requirements for Next Generation Access Technologies.*" 3GPP TR 38.913 Technical Report, 19 pp. Feb. 2016.
Vieira et al. "*A Fleixble 100-antenna Testbed for Massive MIMO.*" Department of Electrical and Information Technology at Lund University. 7pp. Jan. 1, 2014.
"*Bristol and Lund set a New World Record in 5G Wireless Spectrum Efficiency.*" University of Bristol News. 6pp. Mar. 23, 2016.
"*Study on NR New Radio Access Technology.*" 3GPP TSG RAN Meeting #71, 8pp. Mar. 2016.
Working Group Communication Architectures and Technologies. "*LTE Small Cell Enhancement by Dual Connectivity.*" Wireless World Research Forum. 22pp. Nov. 2014.
White Paper. "*LTE in a Nutshell: Protocol Architecture.*" Telesystem Innovations Inc. 12pp. 2010.
"*LTE Random Access Procedure.*" EventHelix.com Inc., 5pp 2015.
Luther, "*5G Massive MIMO Testbed: From Theory to Reality.*" National Instruments. Jun. 8, 2016. pp. 1-11.
"*Introduction to the NI mmWave Transceiver System Hardware*" National Instruments, Apr. 20, 2016. pp. 1-8.
"National Instruments Wireless Research Handbook" National Instruments, May 2016, pp. 1-37.
Shepard et al. "*Argos: Practical Many-Antenna Base Stations*" MobiCom 12, Aug. 22-26, 2012. Istanbul, Turkey. pp. 53-64.
Khoolenjani et al. "*Distribution of the Ratio of Normal and Rice Random Variables*" Digital Commons @WayneState, *Journal of Modern Applied Statistical Methods*, vol. 12, Is 2, Article 27. Nov. 1, 2013. pp. 1-15.
Shen et al. "*Channel Estimation in OFDM Systems*" Freescale Semiconductor, Inc. Application Note, Jan. 2006, pp. 1-16.
Schmidl et al. "Robust Frequency and Timing Synchronization for OFDM." *IEEE Transactions on Communications*, vol. 45, No. 12, Dec. 1997. pp. 1613-1621.

* cited by examiner

1→2: CLOCKWISE ROTATION
2→3: COUNTER-CLOCKWISE ROTATION

1→2: COUNTER-CLOCKWISE ROTATION
2→3: CLOCKWISE ROTATION

Random phase drift in one symbol block

WIRELESS RADIO RECEIVER THAT PERFORMS ADAPTIVE PHASE TRACKING

CROSS REFERENCE TO RELATED APPLICATION(S)

This application is related to U.S. Non-Provisional application Ser. No. 15/879,318, filed concurrently herewith, entitled WIRELESS RADIO RECEIVER THAT PERFORMS ADAPTIVE PHASE TRACKING, and which is hereby incorporated by reference in its entirety.

BACKGROUND

Radios commonly include oscillators to generate sinusoidal signals used to perform up-conversion and down-conversion from base band to carrier frequency and back, respectively. Sinusoidal signals may be characterized by their frequency, amplitude and phase. The oscillator is relied upon to generate a reliable frequency and phase. It has been observed that oscillators tend to generate non-ideal sinusoidal signals, but instead signals with a partially random phase variation over time, commonly referred to as phase noise (PN).

FIG. 1 illustrates graphs, over a 100 microsecond duration, of phase variation in baseband for four different mmWave radio devices. As may be observed, the different devices exhibit very distinct phase drift characteristics.

The phase variations may constitute a dominating impairment for high throughput wireless communications systems operating at high carrier frequencies. The phase variations, if not accounted for correctly, may deteriorate signal quality measures at all parts of the receiver signal processing chain. For instance, the channel estimation quality may be less accurate. Another example is a residual phase rotation of a constellation diagram after equalization at the receiver as shown in FIGS. 2 and 3 for two different radio devices using a binary phase shift keying (BPSK) modulation scheme.

As 5G wireless systems are expected to operate at higher carrier frequencies as compared to 4G wireless systems, this problem can be considered to become a dominating impairment which needs to be carefully accounted for algorithmically at a wireless receiver.

BRIEF SUMMARY

In one aspect the present invention provides a wireless radio receiver that estimates and compensates for phase drift in a series of signal blocks received from a wireless channel. The receiver includes a post-equalization phase tracking unit configured to perform the following for each signal block of the series of signal blocks. The post-equalization phase tracking unit computes an absolute phase rotation at the beginning of the signal block using an equalized version of pilot symbols preceding the signal block. The post-equalization phase tracking unit subdivides the signal block into a time sequence of groups of equalized modulated data symbols. The post-equalization phase tracking unit initializes an accumulated phase associated with the first-in-time group of the time sequence of groups with the computed absolute phase rotation. And, the post-equalization phase tracking unit performs the following for each group of the sequence of groups in time sequential order, in which the group has an associated previous group in the time sequence of groups. The post-equalization phase tracking unit computes a de-rotated version of each equalized modulated data symbol within the group using the accumulated phase associated with the previous group. The post-equalization phase tracking unit blindly estimates a residual phase within the group using the de-rotated version of the equalized modulated data symbols within the group. The post-equalization phase tracking unit assigns the accumulated phase associated with the group with a sum of the blindly estimated residual phase within the group and the accumulated phase associated with the previous group. The post-equalization phase tracking unit estimates phase drift within the group by using at least the accumulated phase associated with the group and computes a phase compensation signal for the group using the estimated phase drift within the group and compensates for phase drift on each equalized modulated data symbol within the group using the computed phase compensation signal.

In one aspect the present invention provides a method for a wireless radio receiver to estimate and compensate for phase drift in a series of signal blocks received from a wireless channel. The method includes performing the following for each signal block of the series of signal blocks. The method includes computing an absolute phase rotation at the beginning of the signal block using an equalized version of pilot symbols preceding the signal block. The method includes subdividing the signal block into a time sequence of groups of equalized modulated data symbols. The method includes initializing an accumulated phase associated with the first-in-time group of the time sequence of groups with the computed absolute phase rotation. And, the method includes performing the following for each group of the sequence of groups in time sequential order, in which the group has an associated previous group in the time sequence of groups. The method includes computing a de-rotated version of each equalized modulated data symbol within the group using the accumulated phase associated with the previous group. The method includes blindly estimating a residual phase within the group using the de-rotated version of the equalized modulated data symbols within the group. The method includes assigning the accumulated phase associated with the group with a sum of the blindly estimated residual phase within the group and the accumulated phase associated with the previous group. The method includes estimating phase drift within the group by using at least the accumulated phase associated with the group. And, the method includes computing a phase compensation signal for the group using the estimated phase drift within the group and compensating for phase drift on each equalized modulated data symbol within the group using the computed phase compensation signal.

In one aspect the present invention provides a non-transitory computer-readable medium having instructions stored thereon that are capable of causing or configuring a wireless radio receiver to perform operations to estimate and compensate for phase drift in a series of signal blocks received from a wireless channel. The operations include performing the following for each signal block of the series of signal blocks. The operations include computing an absolute phase rotation at the beginning of the signal block using an equalized version of pilot symbols preceding the signal block. The operations also include subdividing the signal block into a time sequence of groups of equalized modulated data symbols. The operations also include initializing an accumulated phase associated with the first-in-time group of the time sequence of groups with the computed absolute phase rotation. The operations also include performing the following for each group of the sequence of groups in time sequential order, in which the group has an associated previous group in the time sequence of groups.

The operations also include computing a de-rotated version of each equalized modulated data symbol within the group using the accumulated phase associated with the previous group. The operations also include blindly estimating a residual phase within the group using the de-rotated version of the equalized modulated data symbols within the group. The operations also include assigning the accumulated phase associated with the group with a sum of the blindly estimated residual phase within the group and the accumulated phase associated with the previous group. The operations also include estimating phase drift within the group by using at least the accumulated phase associated with the group. The operations also include computing a phase compensation signal for the group using the estimated phase drift within the group and compensating for phase drift on each equalized modulated data symbol within the group using the computed phase compensation signal.

In other aspects, to subdivide the signal block into a time sequence of groups of equalized modulated data symbols, the post-equalization phase tracking unit subdivides the signal block into N groups, where N is an integer greater than one. The receiver adaptively chooses N based on one or a combination of the following list of factors: a signal to noise ratio associated with the received series of signal blocks, a modulation scheme used by a transmitter to generate the modulated data symbols of the signal blocks, and a rate of change of the phase drift. In one aspect, to estimate phase drift within the group by using at least the accumulated phase associated with the group, the post-equalization phase tracking unit interpolates in a constant fashion using the assigned accumulated phase associated with the group. In one aspect, to estimate phase drift within the group by using at least the accumulated phase associated with the group, the post-equalization phase tracking unit interpolates in a linear fashion using the assigned accumulated phases associated with the group and the previous group in the time sequence and interpolates in a linear fashion using the assigned accumulated phases associated with the group and the next group in the time sequence. In one aspect, to estimate phase drift within the group by using at least the accumulated phase associated with the group, the post-equalization phase tracking unit interpolates in a polynomial fashion using the assigned accumulated phases associated with the group and at least two additional groups in the time sequence.

In other aspects, the post-equalization phase tracking receiver, method and non-transitory computer-readable medium instructions are combined with pre-equalization phase tracking to further improve overall phase tracking. Each signal block of the series comprises a collection of data symbols. An initial signal sequence and a terminal signal sequence are associated with each signal block of the series. The initial and terminal signal sequences of each signal block are identical as transmitted by a transmitter. The initial signal sequence either immediately precedes the signal block or comprises an initial portion of the data symbols of the signal block. The terminal signal sequence either immediately follows the signal block or comprises a terminal portion of the data symbols of the signal block. For each signal block of the series of signal blocks, a pre-equalization phase tracking unit performs the following. The pre-equalization phase tracking unit computes an autocorrelation between a portion of the initial and terminal sequences associated with the signal block and computing a phase of the autocorrelation. The pre-equalization phase tracking unit estimates a start phase of a first symbol within a block processing window associated with the signal block using the computed phase of the autocorrelation and the start phase of the first symbol within the block processing window associated with the previous signal block in the series. The pre-equalization phase tracking unit estimates a phase drift within the block processing window by interpolating using the estimated start phases of the first symbol within the block processing windows associated with at least the signal block and the next signal block in the series. The pre-equalization phase tracking unit computes a phase compensation signal using the estimated phase drift within the block processing window and compensates for the estimated phase drift using the computed phase compensation signal. The portion of the initial and terminal signal sequences have a length. The receiver adaptively chooses the length of the portion using one or a combination of the following list: a signal to noise ratio associated with the received series of signal blocks and one or more estimated characteristics of the wireless channel. The one or more estimated characteristics of the wireless channel are one or a combination of the list comprising: a length of the impulse response of the channel, a delay spread of the channel, and a power delay profile of the channel.

DETAILED DESCRIPTION OF THE EMBODIMENTS

Terms

Figure 1:
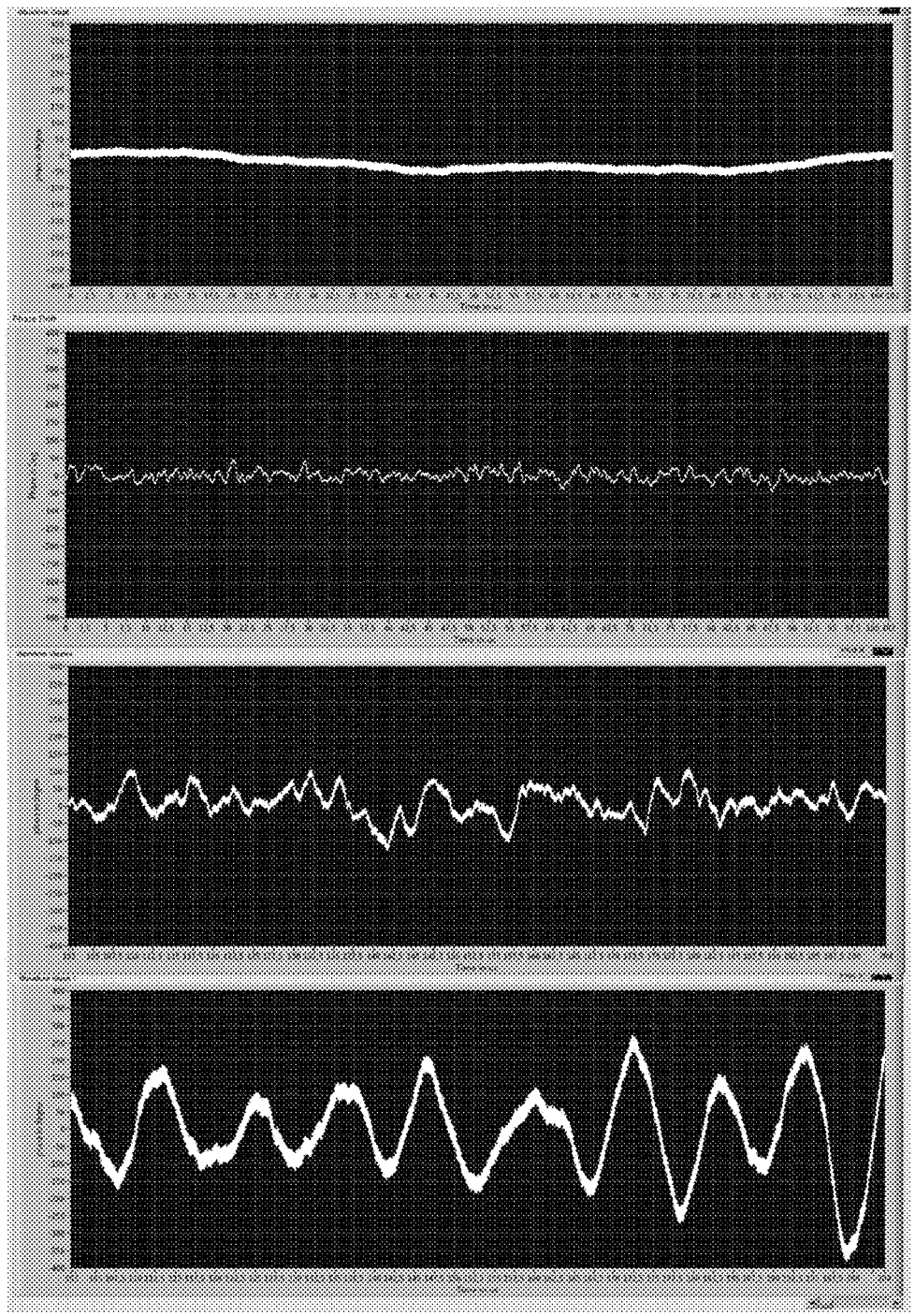
FIG. 1 is a graph of phase variation in baseband for four different mmWave radio devices.
Figure 2:
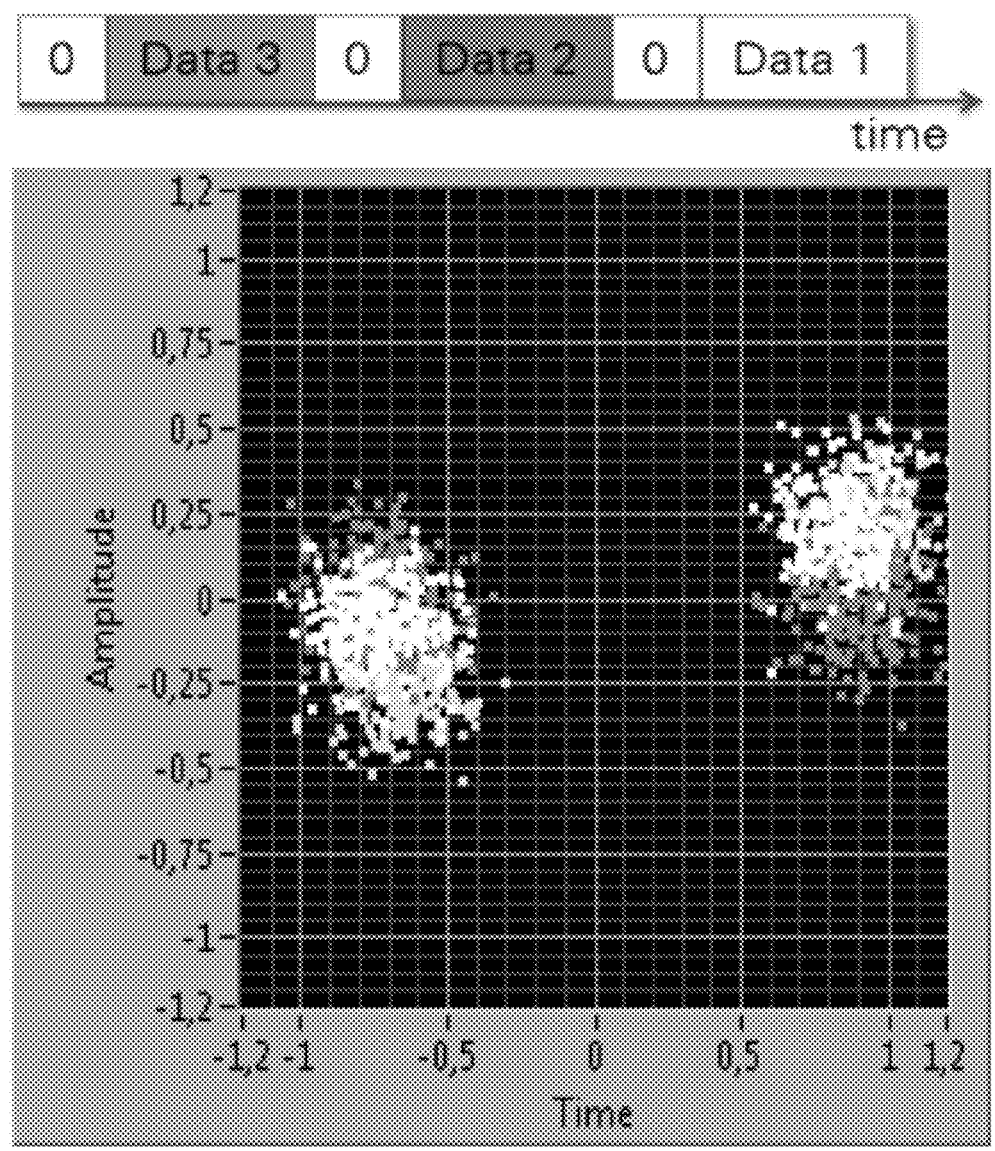
FIGS. 2 and 3 are constellation diagrams illustrating residual phase rotation after equalization for two different radio devices using a binary phase shift keying (BPSK) modulation scheme.
Figure 3:
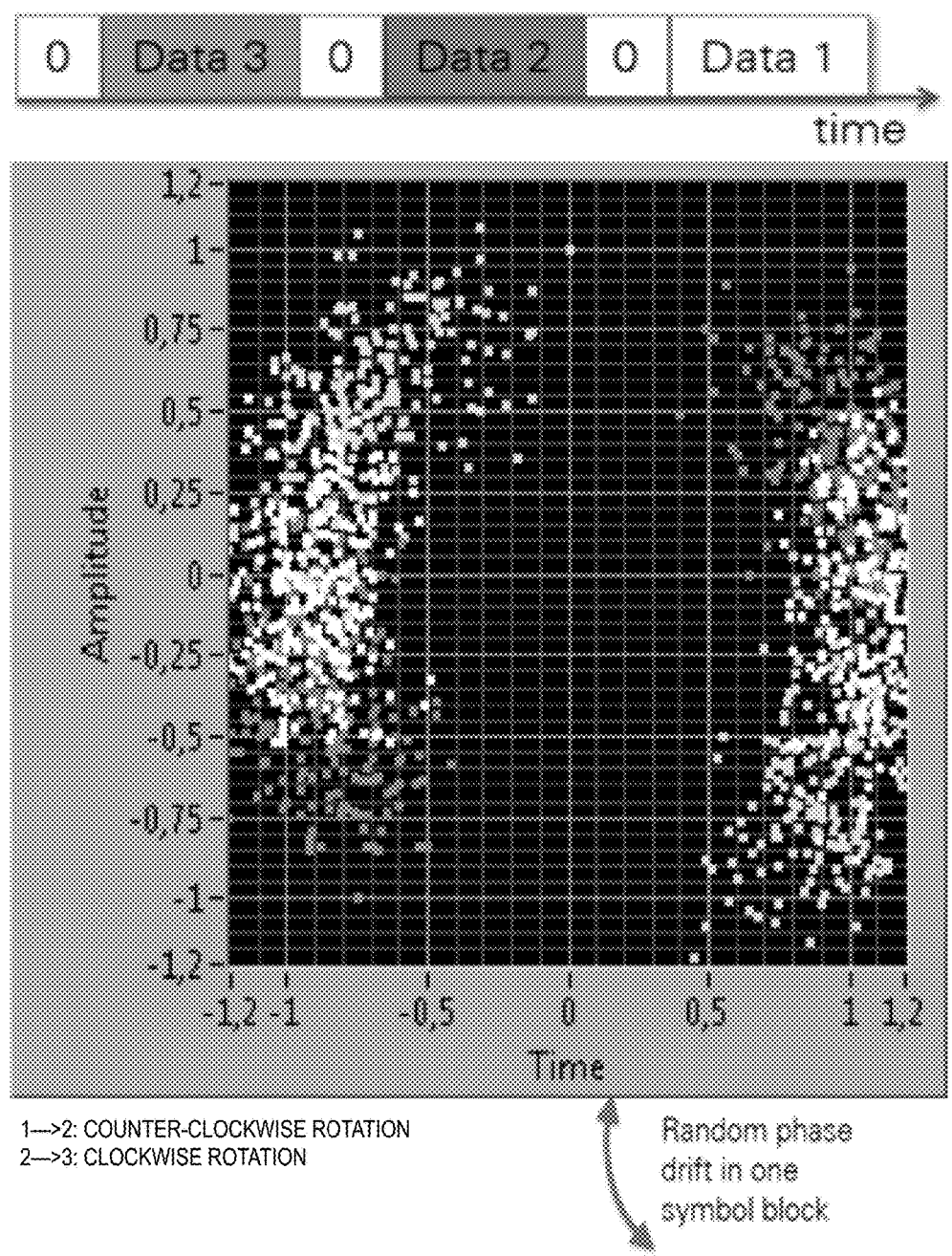

The following is a glossary of terms used in the present application:

A telecommunications channel is a medium between a signal transmitter and a signal receiver. The medium may be a wireless medium, such as air, and also non-wireless mediums, e.g., optical fiber, copper cable (including coaxial cable), or other wired connections.

Phase drift means any time-variant phase rotation of a received signal. Examples of phase drift include, but are not limited to, phase noise and carrier frequency offsets.

A signal block is a collection of data symbols, which may occur in either a single carrier system or in an orthogonal frequency division multiplexed (OFDM) system. In the case of a single carrier system, the signal block is a time domain sequence of modulated data symbols. In the case of an OFDM system, the signal block is a time domain representation of modulated data symbols defined in frequency domain. The single carrier system may include a single carrier-FDMA (SC-FDMA) system. Examples of modulated data symbols include, but are not limited to, quadrature amplitude modulated (QAM) symbols, PSK symbols, and offset QAM symbols.

A symbol is a complex value having a real and imaginary part, and the phase of the symbol is the arctangent of the quotient of the imaginary part divided by the real part.

A guard interval is a period of time between signal blocks. A guard interval may contain a pilot block or a cyclic prefix or a cyclic postfix, for examples.

A pilot block is a sequence of pilot symbols. The pilot symbol values transmitted by the transmitter are also known by the receiver.

An initial signal sequence is either a sequence of symbols in a guard interval that precedes an associated signal block or comprises an initial portion of the data symbols of the signal block and that, as transmitted by a transmitter, are identical to a sequence of symbols included in a terminal signal sequence associated with the signal block. Examples of initial signal sequences are pilot blocks, cyclic prefixes and initial portions of the data symbols of the signal block that are repeated in a cyclic postfix of the associated signal block.

A terminal signal sequence is either a sequence of symbols in a guard interval that follows an associated signal block or comprises a terminal portion of the data symbols of the signal block and that, as transmitted by a transmitter, are identical to a sequence of symbols included in an initial signal sequence associated with the signal block. Examples of terminal signal sequences are pilot blocks, cyclic postfixes and terminal portions of the data symbols of the signal block that are repeated in a cyclic prefix of the associated signal block.

A block processing window is a window of pre-defined length (block length) used to select a block of consecutive data symbols for further joint processing, also referred to as block processing. The further joint/block processing may be, for example, applying a discrete Fourier transform (DFT) on the block of data symbols as an initial step for subsequent processing, such as frequency-domain equalization. Another example of block processing may be data interleaving (e.g., bit interleaving in the context of error correction) within a block of data. Yet another example of block processing may be forward error correction encoding/decoding upon blocks of data (e.g., code words).

Computing a de-rotated version of a data symbol using a phase means to multiply the data symbol by a complex factor with unitary magnitude and the negated phase.

Blindly estimating a residual phase within a group of data symbols means calculating the residual phase by a method in which the transmitted value of each data symbol in the group is unknown to the receiver, but where the receiver may exploit properties of one or more modulation schemes used by the transmitter, and where each transmitted data symbol value is chosen by the transmitter from one of the one or more modulation schemes.

Figure 4:
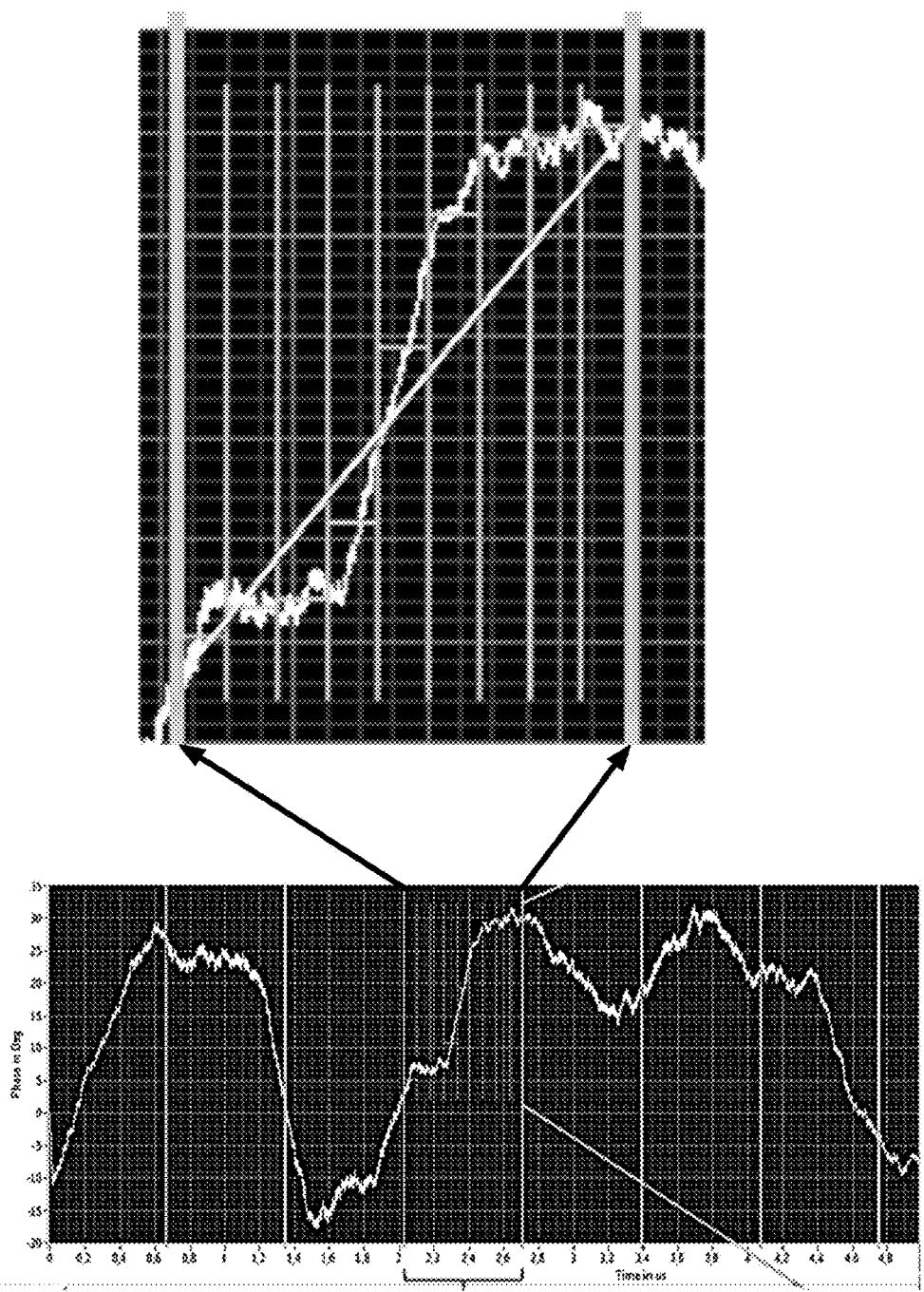
FIG. 4 is a graph of an example of measured phase drift over multiple wireless communication signal blocks shown in the lower part of the page along with a blown-up graph of one of the blocks in the upper part of the page.

Referring now to FIG. 4, a graph of an example of measured phase drift over multiple wireless communication signal blocks is shown in the lower part of the page along with a blown-up graph of one of the blocks in the upper part of the page. As may be observed, the phase drift may be significant and rapidly varying over the period of a single signal block. The phase drift within a signal block may be characterized as having a dominant regular component and an additional residual component. For example, in the blown-up graph of FIG. 4, a dominant regular linear component of the phase drift is shown, and deviations from the linear component constitute the residual component.

Embodiments of a wireless radio receiver are described that estimate the phase drift in two steps in a low-complexity fashion. The first step estimates and compensates for a regular phase drift per block in an early stage of the signal processing chain at the wireless receiver. More specifically, the first step estimates and compensates for the phase drift prior to channel estimation and equalization. The estimated regular phase drift may be modeled as a first-order signal or as a higher-order polynomial signal such as a cubic signal. Advantageously, the reduction in phase drift early in the signal processing chain may improve the accuracy of subsequent signal processing steps, such as channel estimation and equalization. The second step estimates and compensates for the residual small but faster phase drift remaining after removal of the regular phase drift. The residual phase drift removal is performed after channel estimation and equalization. The first step may be referred to herein as primary, pre-equalization, or coarse phase tracking, and the second step may be referred to herein as secondary, post-equalization, or fine phase tracking.

Although the combination of the two steps may be more effective than their individual application, each of the two steps may be useful to compensate for phase drift by itself and may be employed separately, as well as in combination when applicable to the particular wireless signal transmission scheme employed. The process of estimating the phase drift and compensating for it may be referred to herein as phase tracking. The phase tracking steps, whether performed by the receiver individually or in combination, improve its technical function relative to conventional receivers. More specifically, the phase tracking steps may improve the receiver's signal quality (e.g., signal-to-interference-and-noise ratio (SINR)), may improve the receiver's channel estimation and equalization, may increase the receiver's data rates, may allow the system in which the receiver is involved to more accurately predict link quality and assign data rates, and may increase the transmission robustness and reduce transmission error. Different embodiments are described based on different types of guard intervals present between signal blocks that are used to estimate the phase drift and their relationship to a block-processing window (e.g., DFT window), which will now be described. Guard intervals may be used to equalize each signal block individually in frequency domain.

Figure 5:
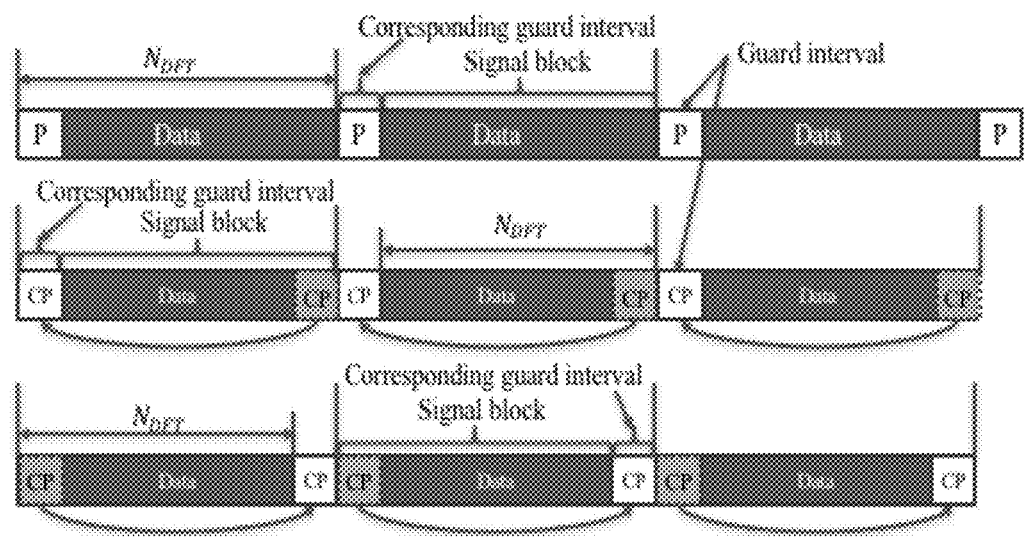
FIG. 5 is a graph illustrating three different signal block transmission schemes.

Referring now to FIG. 5, a graph illustrating three different signal block transmission schemes is shown. Each transmission scheme transmits a sequence of signal blocks separated by guard intervals. In the upper transmission scheme, the guard interval is occupied by a pilot block that contains pilot symbols and that precedes its corresponding signal block, denoted "Data" in a darkened rectangle. The pilot symbol values transmitted by the transmitter are known by the receiver and can therefore be used by the receiver to detect phase drift, as described in more detail below. As shown, the length of the DFT window, denoted $N_{DFT}$, includes the length of both the signal block and the preceding guard interval that includes pilot block. Examples of transmission schemes that include a pilot block in the guard interval include IEEE Standard 802.11ad single carrier systems, among others.

In the middle transmission scheme, the guard interval is occupied by a cyclic prefix (denoted "CP") that also precedes its corresponding signal block. In the middle transmission scheme block diagram, the signal block includes both the darkened "Data" rectangle and the greyed square indicated "CP", which includes the darkened "Data" rectangle, and which is the terminal portion of the signal block. The cyclic prefix is a repetition of the terminal portion of the signal block that follows it and can therefore be used by the receiver to detect phase drift, as described in more detail below. As shown, the length of the DFT window only includes the length of the signal block, but does not include the length of the preceding guard interval that includes cyclic prefix. Examples of transmission schemes that include a cyclic prefix in the guard interval include IEEE Standard 802.11ad OFDM systems and 3$^{rd}$ Generation Partnership Project (3GPP) Long Term Evolution (LTE) systems, among others.

In the bottom transmission scheme, the guard interval is occupied by a cyclic postfix (denoted "CP") that follows its corresponding signal block. In the lower transmission scheme block diagram, the signal block includes both the darkened "Data" rectangle and the greyed square indicated "CP", which precedes the darkened "Data" rectangle, and which is the initial portion of the signal block. The cyclic postfix is a repetition of the initial portion of the signal block that precedes it and can therefore be used by the receiver to detect phase drift, as described in more detail below. As shown, the length of the DFT window only includes the length of the signal block, but does not include the length of the succeeding guard interval that includes cyclic postfix. Both single carrier and OFDM transmissions schemes may include a cyclic postfix in the guard interval.

Embodiments are described in which the block processing window is a discrete Fourier transform (DFT) window. However, other embodiments are contemplated in which other block-based processing is performed or in which block-based equalization is performed that are not restricted to frequency domain equalization. Another example of block-based processing may be data interleaving (e.g., bit interleaving in the context of error correction) within a block of data. Yet another example of block-based processing may be forward error correction encoding/decoding upon blocks of data (e.g., code words).

Figure 6:
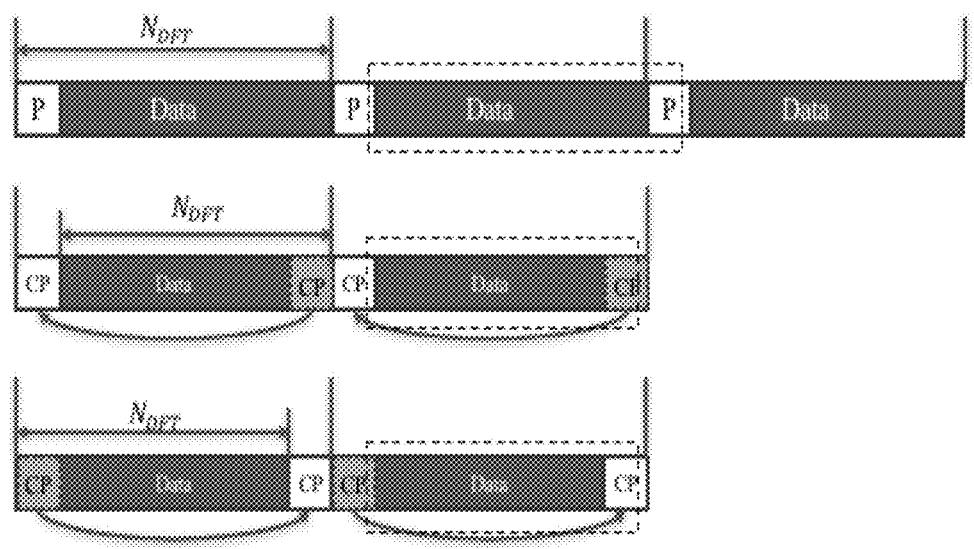
FIG. 6 is a graph illustrating an example of DFT window position as could be applied in a receiver for each of the three signal block transmission schemes of FIG. 5.

Referring now to FIG. 6, a graph illustrating an example of DFT window position as could be applied in a receiver for each of the three signal block transmission schemes of FIG. 5. The DFT window is the portion of the signal block and guard interval that is converted to frequency domain for equalization at the receiver. The DFT may be implemented as a Fast Fourier Transform (FFT); thus, the terms DFT and FFT may be used interchangeably unless otherwise indicated. Generally, the receiver positions the DFT window for a signal block such that it does not cover any portion of the signal blocks that precede or follow the signal block. In FIG. 6, the DFT window is shown as a dashed-line rectangle. As shown, for the pilot block transmission scheme, the DFT window is positioned to start in the guard interval containing the pilot block that precedes the signal block and end in the guard interval containing the pilot block that follows the signal block. Denoting a length of the guard interval containing the pilot block as $N_P$, the length of the signal block is $N_{DFT}-N_P$ symbols. As further shown, for the cyclic prefix transmission scheme, the DFT window is positioned to start in the guard interval containing the cyclic prefix that precedes the signal block and end before the end the signal block, more specifically within the portion of the signal block that is repeated in the cyclic prefix. As further shown, for the cyclic postfix transmission scheme, the DFT window is positioned to start after the beginning of the signal block, more specifically in the portion the signal block that is repeated in the cyclic postfix, and extend into the guard interval containing the cyclic postfix. For both the cyclic prefix and cyclic postfix schemes, the length of the signal block is $N_{DFT}$ symbols, which is equal to the DFT window length.

Figure 7:
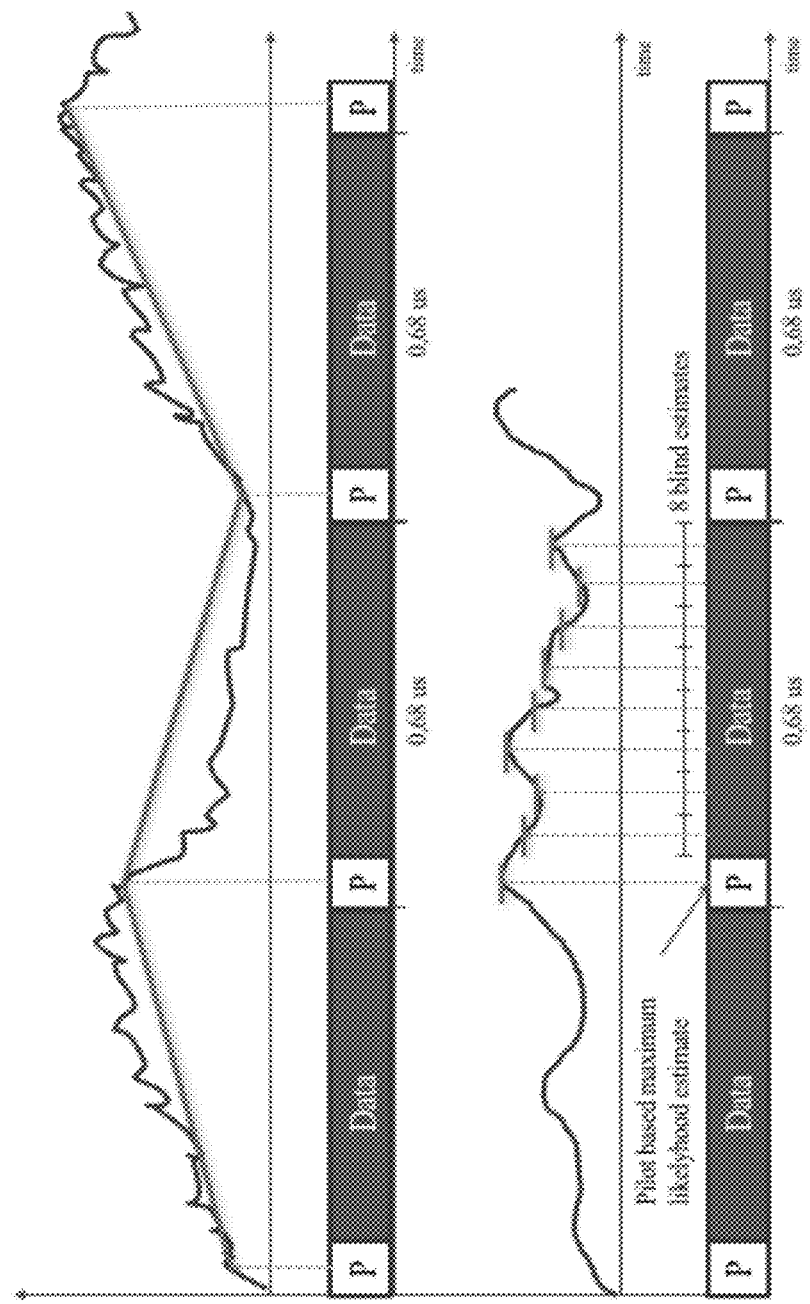
FIG. 7 is a graph illustrating an embodiment employing combined pre-equalization and post-equalization phase tracking.

Referring now to FIG. 7, a graph illustrating an embodiment employing combined pre-equalization and post-equalization phase tracking is shown. The phase tracking embodiment of FIG. 7 is illustrated with a transmission scheme that employs pilot blocks as in the top portion of FIGS. 5 and 6. The top portion of FIG. 7 illustrates a phase drift signal that varies in time over the course of three signal blocks. According to the pre-compensation step, an autocorrelation is performed between corresponding pilot symbols of adjacent pairs of pilot blocks to obtain a phase drift across a DFT window length ($N_{DFT}$ symbols), as described in more detail below. Two or more phase drift values associated with pilot blocks near the signal block are used to interpolate a time-varying phase drift signal over a DFT window associated with the signal block. In the embodiment of FIG. 7, the phase drift values of the two pilot blocks that surround a signal block are used to interpolate a phase drift signal that varies linearly with time. However, other embodiments are described below that employ other numbers of phase drift values to interpolate the phase drift signal (e.g., four to interpolate using a cubic polynomial function). The rate of change of the phase (i.e., the slope of the line) may vary from signal block to signal block, as shown. The interpolated phase drift signal is then used to compensate the phase drift, as described in more detail below. Preferably, a subset of the pilot symbols (or cyclic pre/postfix symbols) in the guard interval are used to perform the autocorrelation. Preferably, the subset is from the latter portion of the guard interval to avoid inter-block interference. Preferably, the size of the subset may be dynamically adjusted by the receiver depending upon, for example, the signal-to-noise ratio (SNR) and/or estimated characteristics of the wireless channel, e.g., the delay spread, impulse response length and/or power delay profile of the channel.

According to the post-equalization step shown in the bottom portion of FIG. 7, an absolute start phase is computed at the guard interval preceding a signal block using the known pilot symbols. An accumulated phase is initialized with the absolute start phase. The signal block is divided up into multiple time-sequential groups of modulated symbols. For a first group in the time sequence, the symbols of the group are compensated using the accumulated phase, a residual phase is computed in the compensated symbols using blind estimation, the accumulated phase-compensated symbols are compensated again using the residual phase, the accumulated phase is updated with the residual phase, and the process is repeated for each of the groups in time sequence. In other embodiments, the residual phases of two or more groups are used to interpolate a phase drift signal for the signal block, e.g., in a linear or polynomial manner, that is used to compensate the accumulated phase-compensated symbols, as described in more detail below. The embodiment of FIG. 7 shows eight groups. Preferably, the receiver may dynamically adjust the number of groups based on, for example, the SNR, the modulation scheme used by the transmitter to generate the modulated data symbols of the signal blocks, and/or a rate of change of the phase drift.

Figure 8:
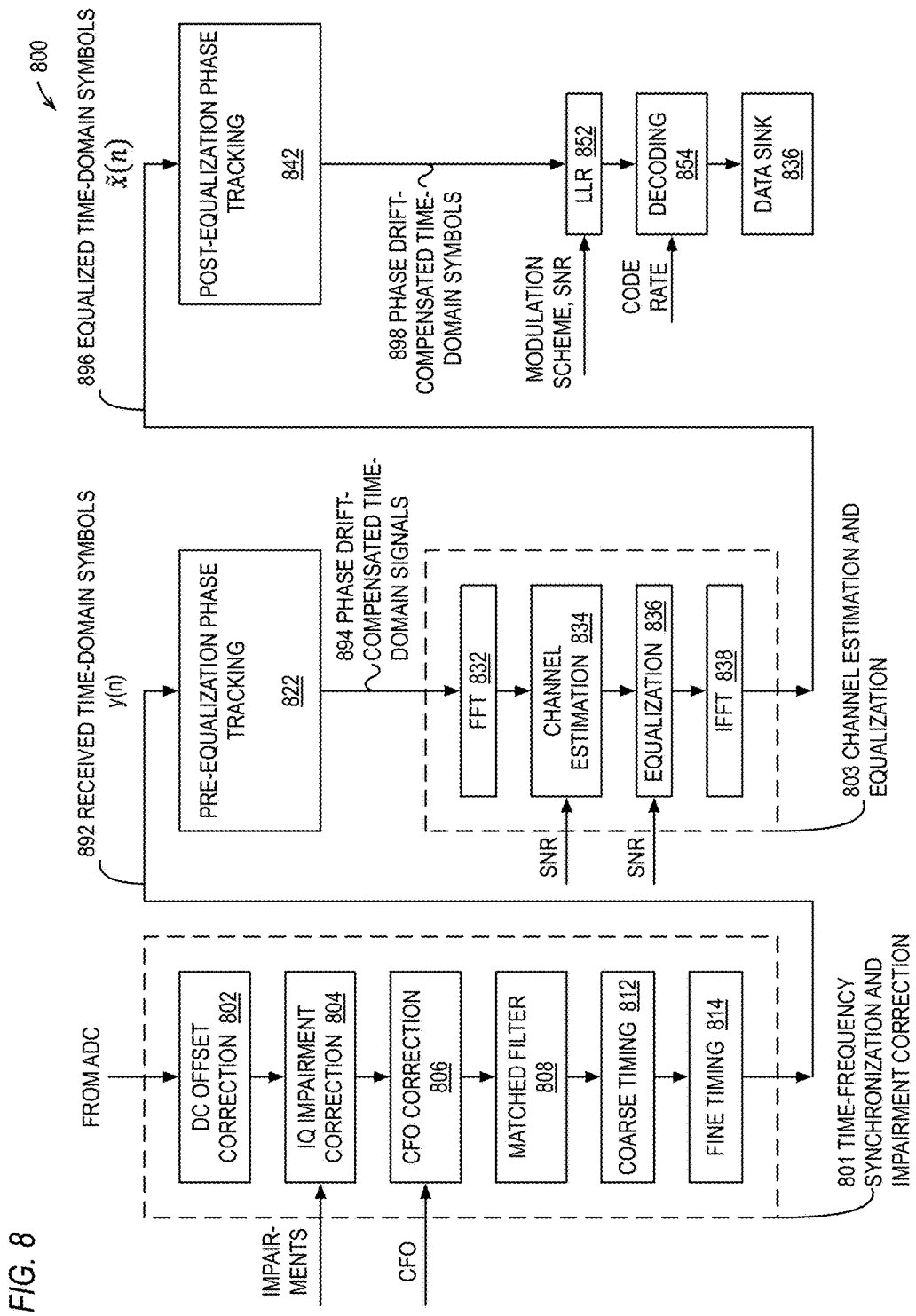
FIG. 8 is a block diagram of a receiver configured to perform phase tracking.

Referring now to FIG. 8, a block diagram of a receiver 800 configured to perform phase tracking is shown. The receiver 800 includes a time-frequency synchronization and impairment correction block 801 that receives unsynchronized and impaired time-domain symbols from an analog-to-digital converter (ADC) (not shown). The ADC receives analog signals from an antenna that may be intermediated by other circuitry (also not shown). The time-frequency synchronization and impairment correction block 801 provides time- and frequency-synchronized time-domain symbols 892, denoted y(n), to a pre-equalization phase tracking block 822 that performs pre-equalization phase tracking according to embodiments described herein to provide phase drift-compensated time-domain symbols 894 to a channel estimation and equalization block 803, which performs channel estimation and equalization in frequency domain to provide equalized time-domain symbols 896, denoted x̃(n), to a post-equalization phase tracking block 842 that performs post-equalization phase tracking according to embodiments described herein to provide further phase drift-compensated time-domain symbols 898 to a log-likelihood ratio (LLR) block 852 whose output is coupled to a decoding block 854. The LLR block 852 computes log-likelihood values for each encoded bit. The decoding block 854 performs forward error correction decoding. The output of the decoding block 854 is coupled to a data sink 856 that consumes the decoded bit stream.

The time-frequency synchronization and impairment correction block 801 includes a DC offset correction block 802 that receives from the ADC the unsynchronized and impaired time-domain symbols upon which it performs DC offset correction. The DC offset correction block 802 output is coupled to an IQ impairment correction block 804 that receives information about the impairments of the receiver 800 for use in correcting of the impairments. The IQ impairment correction block 804 output is coupled to a carrier frequency offset (CFO) correction block 806 that receives CFO information for use in correcting carrier frequency offset. The CFO correction block 806 output is coupled to a matched filter 808 that improves SNR. The matched filter 808 output is coupled to a coarse timing adjustment block 812 whose output is coupled to a fine timing adjustment block 814 that provides the y(n) 892 symbols to the pre-equalization phase tracking block 822. The timing adjustment blocks 812/814 estimate the start of each signal block with a level of accuracy that enables the channel estimation and equalization block 803 to position the location of the DFT window as needed, as described above with respect to FIG. 6 and enables the pre-equalization phase tracking block 822 to perform its phase drift compensation based on the location of the DFT window within the symbol stream. The pre-equalization phase tracking block 822 performs its operations, which are described in more detail below, after the time synchronization by the time-frequency synchronization and impairment correction block 801.

The channel estimation and equalization block 803 includes an FFT block 832 that performs an FFT on the phase-drift compensated time-domain y(n) symbols 892 of a signal block to convert to frequency domain. As described above, the FFT is performed on a DFT block having a DFT block window size, $N_{DFT}$, and having a location position by operation of the time-frequency synchronization and impairment correction block 801. The channel estimation block 834 receives SNR information and uses it to compute a channel estimate in the frequency domain. The equalization block 836 also receives SNR information and uses it to perform equalization in the frequency domain. The IFFT block 838 converts the equalized signal block back to the time domain, thus providing the equalized time-domain symbols x̃(n) 896, which are operated upon by the post-equalization phase tracking block 842 to compensate for residual phase drift not compensated for by the pre-equalization phase tracking block 822.

The receiver 800 may include a programmable signal processor that executes programs stored on the receiver 800 (e.g., in volatile and/or non-volatile random access memory). The signal processor may execute the programs to perform the functions of one or more of the blocks of the receiver 800. Embodiments are also contemplated in which one or more of the blocks of the receiver 800 are performed by dedicated hardware components. Still further, embodiments are contemplated in which one or more of the blocks of the receiver 800 are performed by field-programmable gate arrays (FPGA). Additionally, embodiments are contemplated in which a combination of a signal processor, dedicated hardware and/or FPGAs perform the blocks of the receiver 800. Finally, the receiver 800 may include other elements not shown, such as one or more antennas, oscillators, and other elements utilized in wireless radio receivers, such as those of cellular base stations, user equipment, wireless routers, access points, repeaters and other wireless devices.

The receiver 800 of FIG. 8 illustrates an example of a single carrier receiver. However, the pre-equalization phase tracking block 822 may operate upon both single carrier signal blocks and frequency division multiplex (FDM) signal blocks, such as OFDM, GFDM (generalized frequency division multiplexing), UFMC (universal filtered multi-carrier) with OFDM, f-OFDM (filtered orthogonal frequency division multiplexing), and/or other FDM modulation schemes. Furthermore, embodiments are contemplated in which the post-equalization phase tracking block 842 may operate upon FDM signal blocks. In these FDM embodiments, the IFFT block 838 may be omitted from the receiver 800, and the channel estimation and equalization block 803 provides equalized FDM frequency-domain subcarriers to the post-equalization phase tracking block 842 that performs post-equalization common phase error (CPE) compensation on them according to embodiments described below with respect to FIG. 22.

Figure 9:
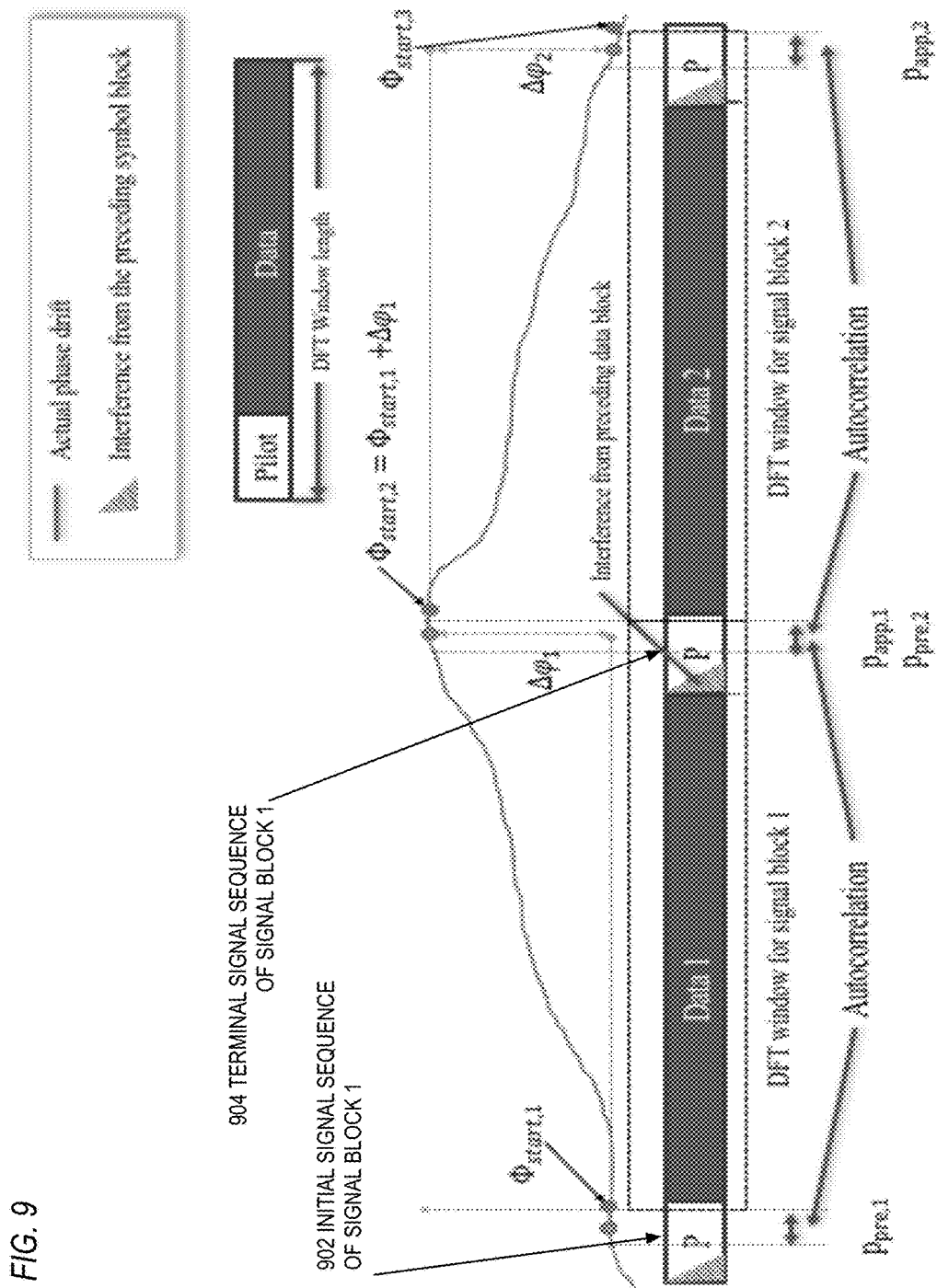
FIG. 9 is a graph illustrating pre-equalization phase tracking.

Referring now to FIG. 9, a graph illustrating pre-equalization phase tracking is shown. The pre-equalization phase tracking may be performed by operation of the pre-equalization phase tracking block 822 of FIG. 8, for example. The pre-equalization phase tracking principle is illustrated in FIG. 9 using an embodiment that includes pilot symbols of a pilot block in the guard intervals that separate the signal blocks, and the pilot block is included in the DFT window length; however, other embodiments are described below that employ cyclic prefixes or cyclic postfixes that are not included in the DFT window length. Although FIG. 9 illustrates two signal blocks separated by three guard intervals, the pre-equalization phase tracking operation is performed for all signal blocks in a series of signal blocks received from a transmitter. The two signal blocks shown are referred to as signal blocks 1 and 2; however, an arbitrary signal block in the series may be referred to as signal block i. Each signal block is prepended and appended by a guard interval. The DFT window for signal block i comprises $N_{DFT}$ symbols. Preferably, the DFT window is positioned a few symbols within the guard interval prepended to the signal block to avoid inter-block interference.

More generally, each signal block has an associated initial signal sequence and terminal signal sequence. An initial signal sequence is either a sequence of symbols in a guard interval that precedes an associated signal block or comprises an initial portion of the data symbols of the signal block and that, as transmitted by a transmitter, are identical to a sequence of symbols included in a terminal signal sequence associated with the signal block. Examples of initial signal sequences are pilot blocks, cyclic prefixes and initial portions of the data symbols of the signal block that are repeated in a cyclic postfix of the associated signal block. A terminal signal sequence is either a sequence of symbols in a guard interval that follows an associated signal block or comprises a terminal portion of the data symbols of the signal block and that, as transmitted by a transmitter, are identical to a sequence of symbols included in an initial signal sequence associated with the signal block. Examples of terminal signal sequences are pilot blocks, cyclic postfixes and terminal portions of the data symbols of the signal block that are repeated in a cyclic prefix of the associated signal block. Preferably, the initial and terminal sequences associated with the signal block are non-zero. In the embodiment of FIG. 9, the initial and terminal signal sequences are pilot blocks that respectively precede and follow the associated signal block. For signal block 1, the initial signal sequence 902 and terminal signal sequence 904 are shown.

For each signal block i, a portion of the received appended pilot symbols, denoted $p_{app,i}(n)$, in the terminal signal sequence is correlated with a portion of the received prepended pilot symbols, denoted $p_{pre,i}(n)$, in the initial signal sequence. The $p_{pre,i}(n)$ and $p_{app,i}(n)$ each comprise $N_{P,AC}$ SYMBOLS, where $N_{P,AC}$ denotes the number of pilot symbols of the pilot block that are autocorrelated, i.e., the length of the portion of the initial/terminal signal sequences that are autocorrelated. The autocorrelation $A_i$ for signal block i is computed per equation (1)

$$A_i = \sum_{n=0}^{N_{P,AC}-1} p_{app,i}(n) \cdot p_{pre,i}^*(n) \tag{1}$$

in which n indicates the index of the pilot symbol within the initial/terminal signal sequence being multiplied. The * operator denotes complex conjugation of the complex pilot symbol.

The phase difference between the two pilot portions, which can be computed from the autocorrelation result, is denoted in equation (2).

$$\Delta\varphi_i = \text{angle}(A_i) \tag{2}$$

The appended pilots of signal block i become the prepended pilots of block i+1.

The estimated start phase $\Phi_i(n=0)=\Phi_{start,i}$ of the first symbol within the DFT window of signal block i is computed by adding the start phase of the DFT window of the previous signal block i−1 ($\Phi_{start,i-1}$) and the phase difference of the current signal block i per equation (3).

$$\Phi_{start,i} = \Phi_{start,i-1} + \Delta\varphi_{i-1} \tag{3}$$

The start phase of the first signal block in a sequence of blocks $\Phi_{start,0}$ is set to be zero. $\Phi_{start,i}$ can be viewed as accumulated phase drift up until the start of the DFT window of signal block i.

One or more start phases before and after signal block i are used to derive an estimate $\Phi_i(n)$ of the regular component of the phase drift within signal block i by interpolation per equation (4).

$$\Phi_i(n) = \text{interp}(\Phi_{start,i-a}, \ldots, \Phi_{start,i}, \ldots, \Phi_{start,i+b}) \tag{4}$$

Various interpolation methods, such as polynomial interpolation, can be used. Embodiments that use linear and cubic interpolation are described below.

The negated regular component of the phase drift $-\Phi_i(n)$ is used to compute a phase compensation signal $e^{-j\Phi_i(n)}$ for block i. The phase drift within signal block i is corrected by multiplying the received signal block with the phase compensation signal per equation (5).

$$y_{Comp,i}(n) = y_i(n) \cdot e^{-j\Phi_i(n)}, 0 \leq n \leq N_{DFT}-1 \tag{5}$$

in which $y_i(n)$ is the symbol n of the received signal block i within the DFT window before phase compensation, and $y_{Comp,i}(n)$ is symbol n of the received signal block i within the DFT window after phase compensation. The phase compensation covers part of the pilot symbols prepended to the next signal block. Therefore, these pilot symbols a copied separately before phase compensation for the current block so they can be used for autocorrelation for the next block i+1 in terms of $p_{pre,i+1}(n)$.

Figure 10:
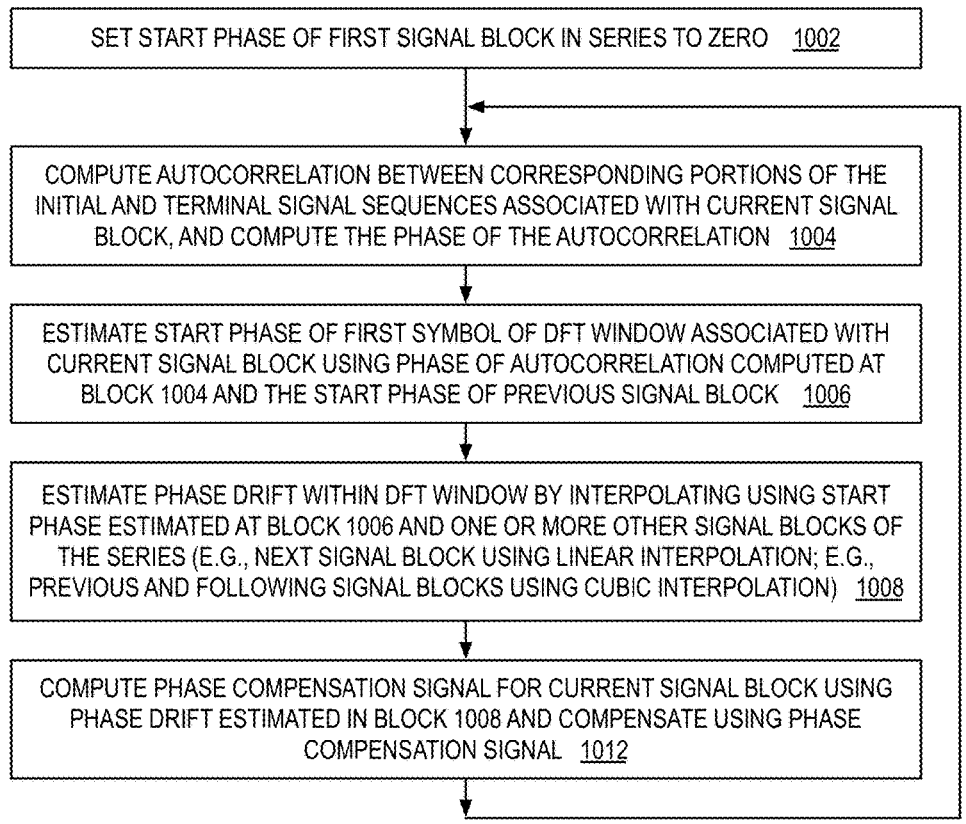
FIG. 10 is a flowchart illustrating pre-equalization phase tracking.

Referring now to FIG. 10, a flowchart illustrating pre-equalization phase tracking is shown. Generally, the operations described in FIG. 10 are performed for a series of signal blocks separated by guard intervals. Flow begins at block 1002.

At block 1002, the start phase of the first signal block in the series is initialized to zero. Flow proceeds to block 1004.

At block 1004, the autocorrelation is computed between corresponding portions of the initial and terminal signal sequences associated with the current signal block, e.g., according to equation (1) above. Additionally, the phase, or angle, of the autocorrelation is computed, e.g., according to equation (2) above. Flow proceeds to block 1006.

At block 1006, the start phase for the current signal block is estimated, e.g., according to equation (3) above. Flow proceeds to block 1008.

At block 1008, the regular component of the phase drift within the DFT window associated with the current signal block is estimated using the start phase of the current signal block and one or more other signal blocks in the series, depending upon the interpolation method used, e.g., according to equation (4) above. Embodiments using linear interpolation and cubic interpolation methods are described below with respect to FIGS. 12 through 14. However, other embodiments are contemplated in which other interpolation methods are used, such as employing an interpolation filter based on assumed or estimated statistical properties of the phase drift. For another example, zero order hold interpolation may be employed with the pre-equalization phase tracking method. In such case, the phase drift within signal block i is assumed to be constant $\Phi_i(n)=\Phi_{start,i}$ independent of the symbol index n. Flow proceeds to block 1012.

At block 1012, a phase compensation signal for the current signal block is computed using the phase drift estimated in block 1008, and the signal block is compensated using the phase compensation signal, e.g., according to equation (5) above. Flow returns from block 1012 to block 1004 for the next signal block in the series of signal blocks. Although steps 1004 through 1012 of FIG. 10 are shown as occurring in sequential order on a per signal block basis, it may be necessary, depending upon the interpolation method used, to delay performance of blocks 1008 and 1012 until steps 1004 and 1006 have been performed for one or more following signal blocks, particularly in the case of polynomial interpolation beyond first-order (linear) interpolation, if the start phases of following signal blocks are used.

Figure 11:
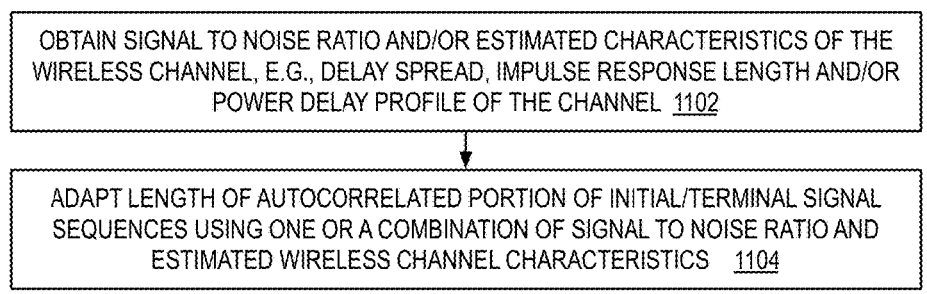
FIG. 11 is a flowchart illustrating operation of an aspect of pre-equalization phase tracking to dynamically adjust the length of the auto-correlated portion of the initial/terminal signal sequences.

Referring now to FIG. 11, a flowchart illustrating operation of an aspect of pre-equalization phase tracking to dynamically adjust the length of the auto-correlated portion of the initial/terminal signal sequence is shown. The guard interval (e.g., pilot symbols, cyclic pre/postfix) may contain interference from the preceding signal block if the wireless channel is time dispersive, which may result in inter-block interference (IBI). More interference deteriorates the phase estimation accuracy. Preferably, the autocorrelation function is computed in the part of the guard interval which is assumed to be mostly interference free. Advantageously, the length of the portion of the initial/terminal signal sequences used for autocorrelation (e.g., $N_{P,AC}$, in the case of the pilot symbols, as described above with respect to FIG. 9) can be chosen adaptively by the receiver to optimize the accuracy of the autocorrelation estimate. Flow begins at block 1102.

At block 1102, the receiver (e.g., receiver 800 of FIG. 8) obtains the signal-to-noise ratio (SNR) and/or estimated characteristics of the wireless channel, e.g., the delay spread, impulse response length and/or power delay profile of the channel. This may be performed by a control processor of the receiver, for example. Flow proceeds to block 1104.

Figure 14:
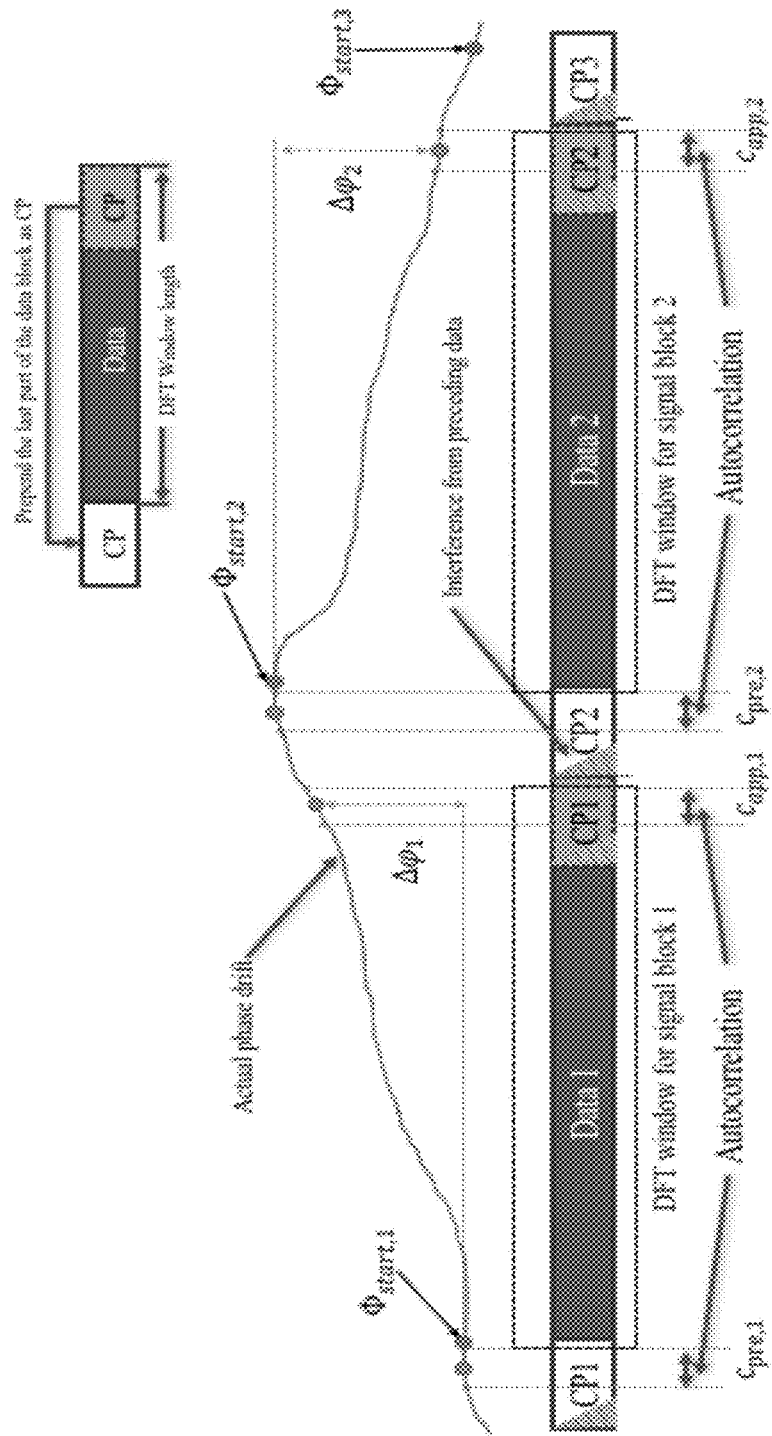
FIG. 14 is a graph illustrating an embodiment of pre-equalization phase tracking start phase estimation as applied to a cyclic prefix transmission scheme.

At block 1104, the receiver adapts the length of the auto-correlated portion of the initial and terminal signal sequences—e.g., $p_{pre,1}$ and $p_{app,1}$ of FIG. 9, as in equation (1), or similar corresponding auto-correlated portions for transmission schemes that employ cyclic prefixes or cyclic postfixes, e.g., $c_{pre,1}$ and $c_{app,1}$ of FIG. 14—using one or a combination of the information obtained at block 1102. Preferably, during the design process of the receiver, a model is derived to determine the impact of thermal noise and inter-block interference (e.g., impact of the channel impulse response) on the phase estimation accuracy. At run time, the receiver uses the pre-derived model to choose the length of the auto-correlated portion of the initial and terminal signal sequences such that the phase estimation error is minimized. For example, the length may be increased inversely proportionally to the delay spread. The length of the channel impulse response and power delay profile have a similar impact on the length of the auto-correlated portion. The longer the channel impulse response (or the length of the power delay profile), the shorter the length of the auto-correlated portions should be chosen. The lower the SNR, the longer the length of the auto-correlated portion should be chosen. There is a trade of between SNR and length of the channel impulse response. The goal is to minimize the phase estimation error which depends on the thermal noise (SNR) and the length of the channel impulse response (inter-block interference). At low SNR, the length of the auto-correlated portion can be chosen longer, accepting some inter-block interference due to the time dispersive channel. At high SNR, less inter-block interference can be accepted and the length of the auto-correlated portion should be smaller. Flow ends at block 1104.

Figure 12:
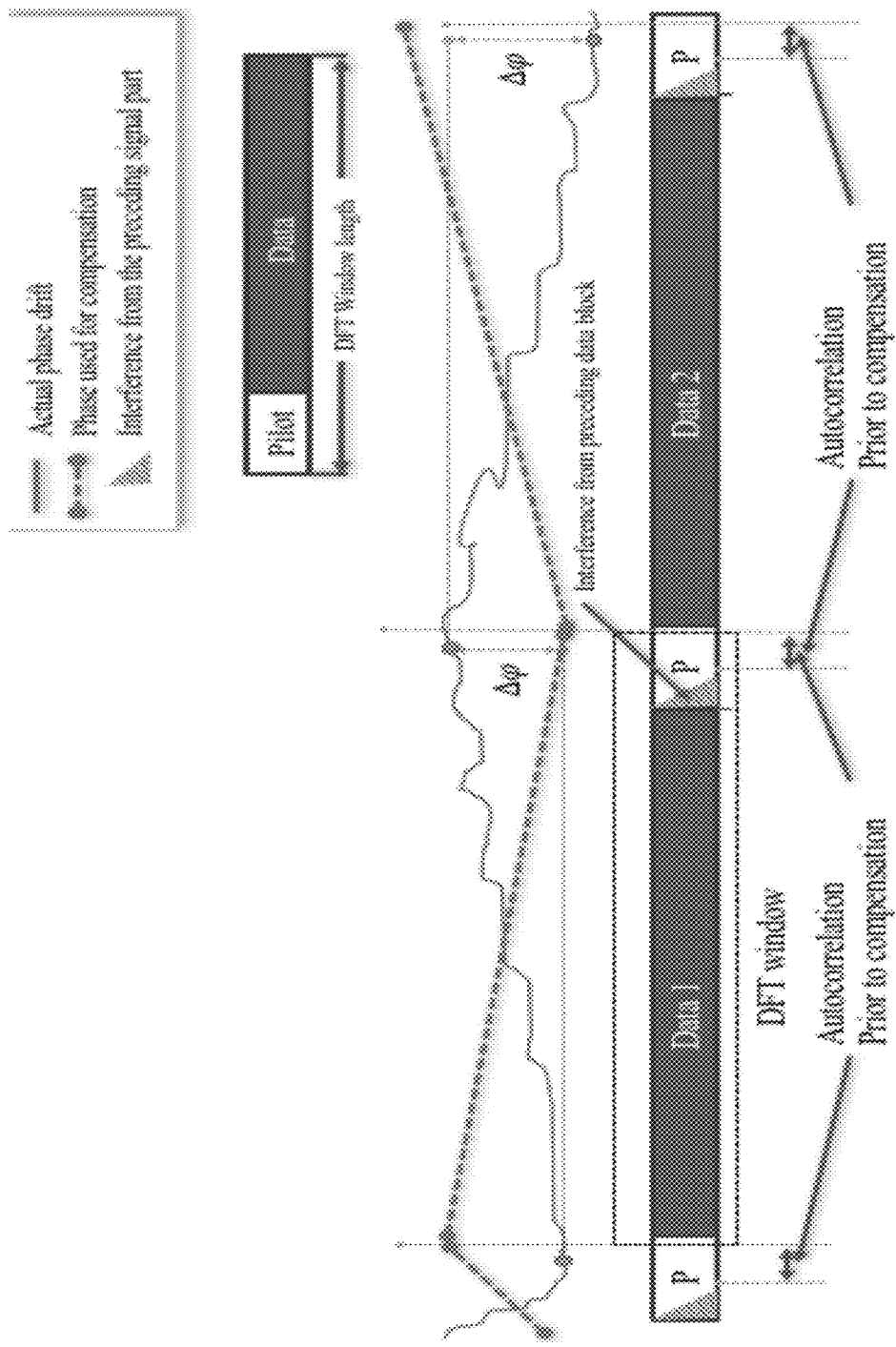
FIG. 12 is a graph illustrating an embodiment of pre-equalization phase tracking using a linear interpolation method as applied to a pilot-block transmission scheme.

Referring now to FIG. 12, a graph illustrating an embodiment of pre-equalization phase tracking using a linear interpolation method as applied to a pilot-block transmission scheme is shown. In this case, pilot symbols are prepended to the signal block as shown in FIG. 12, and the phase compensation signal is computed by linear interpolation. The embodiment of FIG. 12 has many similarities to the embodiment of FIG. 9, so primarily differences between them will be described.

The phase drift within signal block i is assumed to follow a linear function $\Phi_i(n)=a_i n+b_i$ of the symbol index n. For signal block i, only the start phase $\Phi_{start,i}$ and $\Phi_{start,i+1}$ need to be known, and the linear regular component of the phase drift can be estimated by linear interpolation per equation (6).

$$\Phi_i(n)=\mathrm{interp}(\Phi_{start,i},\Phi_{start,i+1}), 0 \leq n \leq N_{DFT}-1 \qquad (6)$$

The coefficients $a_i$ and $b_i$ of this linear function are given by equations (7) and (8)

$$a_i=\Delta\varphi_i/N_{DFT} \qquad (7)$$

$$b_i=\Phi_{start,i} \qquad (8)$$

where $a_i$ is the slope of the phase per symbol. Advantageously, the start phases are computed and used in such a manner as to avoid phase discontinuities with the DFT window.

Figure 13:
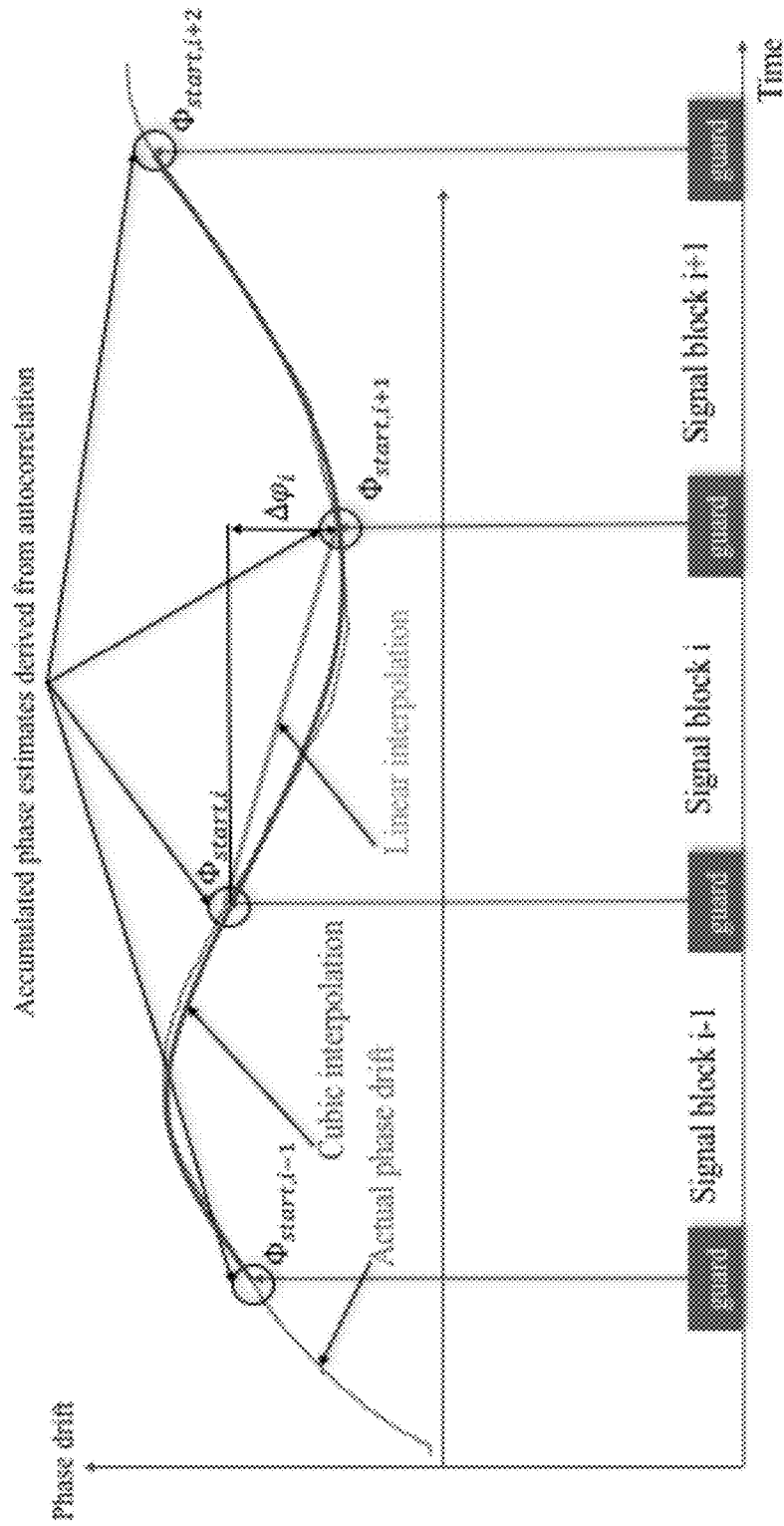
FIG. 13 is a graph illustrating an embodiment of pre-equalization phase tracking using a cubic interpolation method as applied to a pilot-block transmission scheme.

Referring now to FIG. 13, a graph illustrating an embodiment of pre-equalization phase tracking using a cubic interpolation method as applied to a pilot-block transmission scheme is shown. In this case, pilot symbols are prepended to the signal block as shown in FIG. 13, and the phase compensation signal is computed by cubic interpolation. The embodiment of FIG. 13 has many similarities to the embodiment of FIG. 9, so primarily differences between them will be described.

The regular component of the phase drift within signal block i is assumed to follow a cubic function of the symbol index n., as shown in equation (9).

$$\Phi_i(n)=a_i n^3+b_i n^2+c_i n+d_i, 0 \leq n \leq N_{DFT}-1 \qquad (9)$$

In FIG. 13, the actual phase drift and the phase drift estimated by cubic interpolation are shown. The phase drift estimated using linear interpolation is also shown for comparative purposes. For signal block i, only the start phases $\Phi_{start,i-1}$, $\Phi_{start,i}$, $\Phi_{start,i+1}$ and $\Phi_{start,i+2}$ need to be known to compute the phase drift as $\Phi_i(n)=\text{interp}(\Phi_{start,i-1}, \Phi_{start,i}, \Phi_{start,i+1}, \Phi_{start,i+2})$. The coefficients $a_i$, $b_i$, $c_i$, $d_i$ of equation (9) may be computed according to equations (10), (11), (12) and (13).

$$\Phi_i(n=-N\_DFT)=\Phi_{start,i-1} \tag{10}$$

$$\Phi_i(n=0)=\Phi_{start,i} \tag{11}$$

$$\Phi_i(n=N_{DFT})=\Phi_{start,i+1} \tag{12}$$

$$\Phi_i(n=2N_{DFT})=\Phi_{start,i+2} \tag{13}$$

Equations (10), (11), (12) and (13) yield four equations for four unknowns, which enables the coefficients $a_i$, $b_i$, $c_i$, $d_i$ to be solved for using any suitable mathematical method. Note that $d_i=\Phi_{start,i}$.

Referring now to FIG. 14, a graph illustrating an embodiment of pre-equalization phase tracking start phase estimation as applied to a cyclic prefix transmission scheme, such as may be used in an LTE downlink OFDM modulation scheme or an LTE uplink single carrier modulation scheme, is shown. In this case, cyclic prefixes are prepended to the signal blocks as shown in FIG. 14, and the phase compensation signal may be computed by interpolation, similar to those described above with respect to the pilot block-based embodiments. A relatively low complexity embodiment may include computing the phase compensation signal through linear interpolation. The embodiment of FIG. 14 has many similarities to the embodiment of FIG. 9, so primarily differences between them will be described. Differences relate to the computation of start phases $\Phi_{start,i}$ as follows.

In this case, a cyclic prefix of length $N_{CP}$ is prepended to the signal block of length $N_{DFT}$ as shown in FIG. 14, and the phase compensation signal is computed by linear interpolation. Note that the cyclic prefix contains a copy of the last $N_{CP}$ symbols of the current signal block. For a signal block i, a portion of the received last part of the OFDM symbol, denoted $c_{app,i}(n)$, in the terminal signal sequence is correlated with a portion of the received prepended cyclic prefix, denoted $c_{pre,i}(n)$, in the initial signal sequence. The $c_{pre,i}$ and $c_{app,i}$ each comprise $N_{C,AC}$ symbols. The phase difference $\Delta\varphi_i$ is computed by autocorrelating $c_{app,i}(n)$ with $c_{pre,i}(n)$ similar to the manner described above with respect to equations (1) and (2).

The $c_{app,i}(n)$ and $c_{pre,i}(n)$, used to compute the phase difference, are separated by $N_{DFT}$ symbols. On the other hand, the first symbols of two consecutive DFT windows are separated by $N_{DFT}+N_{CP}$ symbols. Hence, computing the starting phase for signal block i+1 using the start phase of signal block i and the phase difference $\Delta\varphi_i$ requires linear extrapolation as shown in equation (14).

$$\Phi_{start,i+1} = \Phi_{start,i} + \frac{\Delta\varphi_i}{N_{DFT}} \cdot (N_{DFT} + N_{CP}) \tag{14}$$

Figure 15:
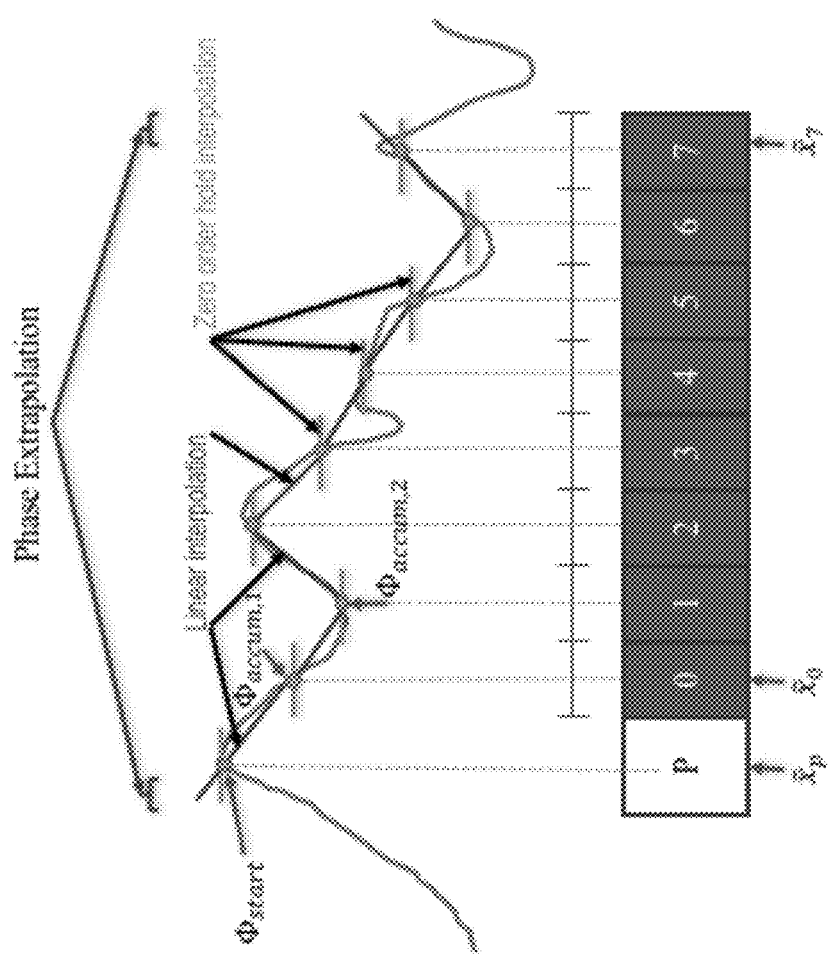
FIG. 15 is a graph illustrating post-equalization phase tracking.

Referring now to FIG. 15, a graph illustrating post-equalization phase tracking is shown. The post-equalization phase tracking may be performed by operation of the post-equalization phase tracking block 842 of FIG. 8, for example. The task of post-equalization phase tracking is to compensate for any residual phase errors in the equalized signal. Two cases can be distinguished.

In the case of single carrier modulation, the output of the equalizer (e.g., equalization block 836 of FIG. 8) delivers noisy modulated data symbols in time domain. Post-equalization phase tracking for single carrier modulation is described generically with respect to FIGS. 15 and 16. Post-equalization phase tracking can be performed with different phase interpolation methods similar those described above with respect to pre-equalization phase tracking, such as zero order hold interpolation and linear interpolation described herein, although other methods such as cubic interpolation may be employed.

In the case of FDM modulation, the output of the equalizer delivers noisy modulated data symbols in frequency domain. An FDM-based common phase error (CPE) estimation and compensation method may be used to perform post-equalization phase tracking in the case of OFDM modulation, as described below with respect to FIG. 22.

For post-equalization phase tracking, each signal block can be processed independently of other signal blocks. Hence, the process for a single signal block is described. However, although FIG. 15 illustrates a single signal block preceded by a pilot block, the post-equalization phase tracking operation is performed for all signal blocks in a series of signal blocks received from a transmitter.

Each signal block, preceded by a pilot block, is subdivided into $N_G$ groups of equalized symbols of length $N_S$ symbols each. The example of FIG. 15 has $N_G=8$ groups, indexed $0 \le j \le N_G-1$, and the equalized symbols belonging to group j are denoted $\tilde{x}_j(n)$, $0 \le n \le N_S-1$.

Denoting the received equalized pilot symbols $\tilde{x}_p(n)$ and the transmitted pilot symbols $p(n)$, with $0 \le n \le N_p-1$, the cross-correlation and start angle may be computed according to respective equations (15) and (16). The start angle, or start phase, $\Phi_{start}$, is an absolute phase rotation at the beginning of the signal block.

$$C = \sum_{n=0}^{N_p-1} \tilde{x}_p(n) p*(n) \tag{15}$$

$$\Phi_{start}=\text{angle}(C) \tag{16}$$

An initial accumulated phase value is set according to equation (17).

$$\Phi_{accum,-1}=\Phi_{start} \tag{17}$$

For each group of equalized symbols $\tilde{x}_j$ starting with the first group (j=0), all symbols in $\tilde{x}_j$ are multiplied with $e^{-j\Phi_{accum,j-1}}$, resulting in $\tilde{x}'_j$ according to equation (18).

$$\tilde{x}'_j=\tilde{x}_j \cdot e^{-j\Phi_{accum,j-1}} \tag{18}$$

Next, a residual phase rotation for group j, $\Phi_{res,j}$, is blindly estimated using the symbols in $\tilde{x}'_j$. The blind estimation can be implemented using, for example, the method described in T. A. Thomas, M. Cudak and T. Kovarik, "Blind Phase Noise Mitigation for a 72 GHz Millimeter Wave System", IEEE Int. Conf. on Communications (ICC), 2015, which is hereby incorporated by reference in its entirety for all purposes, or other similar method. More specifically, the post-equalization phase tracking block 842 multiplies all $\tilde{x}_j$ in the second and fourth quadrants by the imaginary unit j (i.e., $\sqrt{-1}$) and calculates the residual phase rotation for group j, $\Phi_{res,j}$, according to equation (19).

$$\Phi_{res,j} \approx \frac{\sum_{n=0}^{N_G-1}\left(|\text{Re}(\tilde{x}'_j(n))|^2 - |\text{Im}(\tilde{x}'_j(n))|^2\right)}{4\sum_{n=0}^{N_G-1}|\text{Re}(\tilde{x}'_j(n))||\text{Im}(\tilde{x}'_j(n))|} \quad (19)$$

Next, the accumulated phase is updated per equation (20).

$$\Phi_{accum,j} = \Phi_{accum,j-1} + \Phi_{res,j} \quad (20)$$

One or more accumulated phases before and after the group of equalized symbols j are then used to derive an estimate $\Phi_j(n)$ of the phase drift within the group of equalized symbols j by interpolation per equation (21).

$$\Phi_j(n) = \text{interp}(\Phi_{accum,j-d}, \ldots, \Phi_{accum,j}, \ldots, \Phi_{accum,j+e}) \quad (21)$$

In the case of zero order hold interpolation, the phase of the phase compensation signal $e^{-j\Phi_j(n)}$ for equalized group of symbols j is given by equation (22).

$$\Phi_j(n) = \Phi_{accum,j}, 0 \leq n \leq N_S - 1 \quad (22)$$

Figure 17:
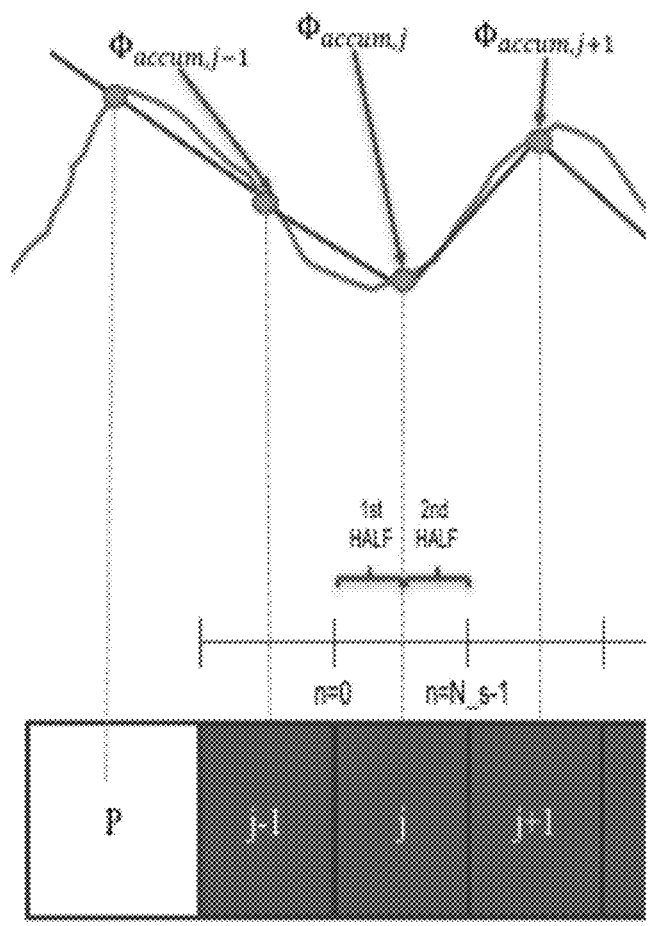
FIG. 17 is a graph illustrating an embodiment of post-equalization phase tracking using a linear interpolation method.

Linear interpolation is described in more detail with respect to FIG. 17. As described above, various other interpolation methods can be applied, such as polynomial (e.g., cubic) interpolation or statistical-based interpolation.

The negated phase drift $-\Phi_j(n)$ is used to compute a phase compensation signal $e^{-j\Phi_j(n)}$, and the phase drift within the group of equalized symbols j is corrected by multiplying the received group of equalized symbols j with the phase compensation signal per equation (23).

$$\tilde{x}_{Comp,j}(n) = \tilde{x}_j(n) \cdot e^{-\Phi_j(n)}, 0 \leq n \leq N_S - 1 \quad (23)$$

where $\tilde{x}_{Comp,j}(n)$ is symbol n of the group j of equalized symbols after compensating for the residual phase drift. As may be observed, the guard interval of each signal block serves as an anchor point for phase estimation. The phase deviations estimated in previous signal blocks do not need to be known. This prevents propagating a falsely estimated phase from block to block as would happen if the phase estimation would be carried out completely blind, without using any pilot symbols.

Figure 16:
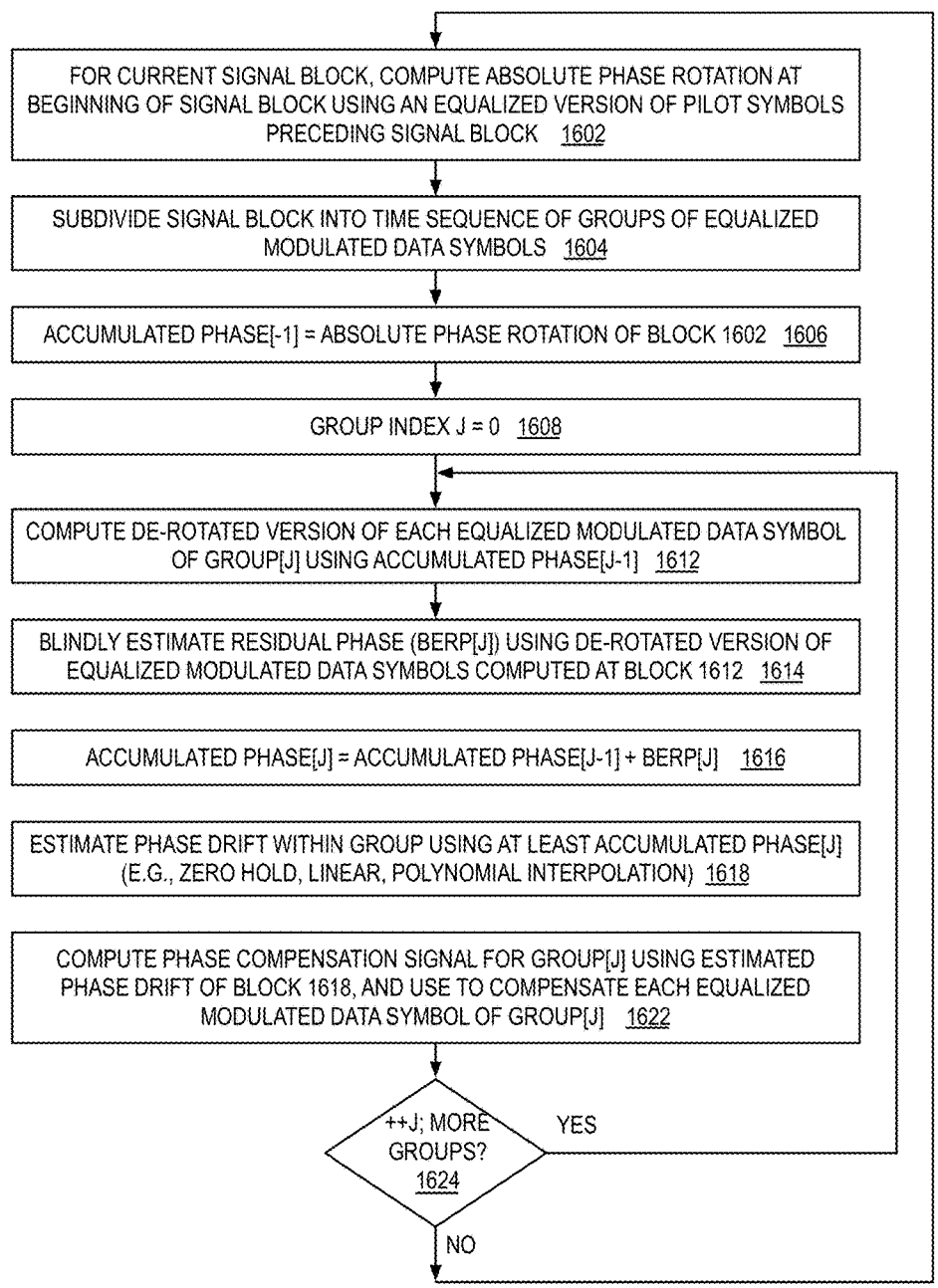
FIG. 16 is a flowchart illustrating post-equalization phase tracking.

Referring now to FIG. 16, a flowchart illustrating post-equalization phase tracking is shown. Flow begins at block 1602.

At block 1602, for the current signal block in a series of signal blocks, the receiver computes the absolute phase rotation at the beginning of signal block using an equalized version of pilot symbols in the guard interval preceding the signal block, e.g., as in equations (15) and (16). Flow proceeds to block 1604.

At block 1604, the receiver effectively subdivides the signal block into a time sequence of groups of equalized modulated data symbols, e.g., as shown in FIG. 15. Flow proceeds to block 1606.

At block 1606, the receiver assigns an initial accumulated phase with the absolute phase rotation computed at block 1602, e.g., as in equation (17). As described below, each group in the time sequence has a respective index and will have an associated accumulated phase as the groups are processed. Programmatically, the receiver associates the initial accumulated phase with a fictional group in time sequence preceding the first group of the signal block (e.g., the pilot symbols). Thus, assuming an index value of zero for the first group in the time sequence, the index of the imagined group is −1. Flow proceeds to block 1608.

At block 1608, the receiver assigns the group index j the value 0 so that the first group in the time sequence is processed first. Flow proceeds to block 1612.

At block 1612, the receiver computes a de-rotated version of each equalized modulated data symbol of group j using the accumulated phase associated with the previous group in the time sequence, e.g., as in equation (18). Flow proceeds to block 1614.

At block 1614, the receiver blindly estimates a residual phase using the de-rotated version of the equalized modulated data symbols computed at block 1612, e.g., according to the methods described above with respect to FIG. 15. Flow proceeds to block 1616.

At block 1616, the receiver computes the accumulated phase associated with the current group as the sum of the accumulated phase associated with the previous group and the blindly estimated residual phase of block 1614, e.g., as in equation (20). Flow proceeds to block 1618.

At block 1618, the receiver estimates the phase drift within the current group, e.g., as in equation (21), using the accumulated phase associated with the current group, e.g., zero hold interpolation as in equation (22), and optionally the accumulated phase associated with other groups, e.g., linear interpolation also using previous and following groups as in equations (24) through (28), or polynomial interpolation using multiple other groups. Flow proceeds to block 1622.

At block 1622, the receiver computes a phase compensation signal for group j using the phase drift estimated at block 1618 and uses the computed phase compensation signal to compensate each equalized modulated data symbol of group j, e.g., as in equation (23). Flow proceeds to block 1624.

At block 1624, the receiver increments the group index j. If there are more groups in the signal block, flow proceeds to block 1612 to process the next group; otherwise, flow returns to block 1602 to process the next signal block in the series.

Referring now to FIG. 17, a graph illustrating an embodiment of post-equalization phase tracking using a linear interpolation method is shown. For the group of equalized symbols j, the phase of the phase compensation signal $e^{-\Phi_j(n)}$ is computed in two steps.

For the first half of the group, a change is phase is computed according to equation (24).

$$\Delta\Phi_{j-1} = \frac{(\Phi_{accum,j} - \Phi_{accum,j-1})}{N_S} \quad (24)$$

The phase of the phase compensation signal $e^{-j\Phi_j(n)}$ is given by equation (25).

$$\Phi_j(n) = \Phi_{accum,j-1} + \Delta\Phi_{j-1}\left(\frac{N_S}{2} + n\right), 0 \leq n \leq \frac{N_S}{2} - 1 \quad (25)$$

For the second half of the group, a change is phase is computed according to equation (26).

$$\Delta\Phi_j = \frac{(\Phi_{accum,j+1} - \Phi_{accum,j})}{N_S} \quad (26)$$

The phase of the phase compensation signal $e^{-j\Phi_j(n)}$ is given by equation (27).

$$\Phi_j(n) = \Phi_{accum,j} + \Delta\Phi_j\left(n - \frac{N_S}{2}\right), \frac{N_S}{2} \le n \le N_S - 1 \quad (27)$$

The phase of the phase compensation signal $e^{-j\Phi_j(n)}$ for the last group of equalized symbols in a signal block is given by equation (28).

$$\Phi_j(n) = \Phi_{accum,j-1} + \Delta\Phi_{j-1}\left(\frac{N_S}{2} + n\right), 0 \le n \le N - 1 \quad (28)$$

Figure 18:
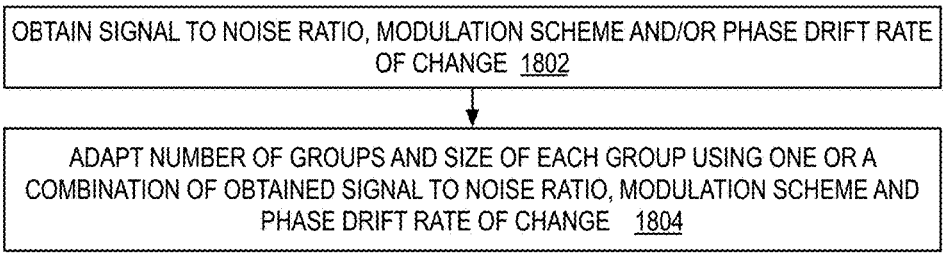
FIG. 18 is a flowchart illustrating operation of an aspect of post-equalization phase tracking to dynamically adjust the number of groups and size of each group per signal block.

Referring now to FIG. 18, a flowchart illustrating operation of an aspect of post-equalization phase tracking to dynamically adjust the number of groups and size of each group per signal block is shown. Advantageously, the number of groups, and consequently the size of each group, used for the cross-correlation of equation (15) can be chosen adaptively by the receiver to optimize the accuracy of the start phase estimate of equation (16). Different lengths of a group are optimal under different parameter sets. Influencing parameters are modulation scheme, phase drift characteristics, and SNR, for example. Flow begins at block 1802.

At block 1802, the receiver (e.g., receiver 800 of FIG. 8) obtains the SNR, modulation scheme, and phase drift rate of change. This may be performed by a control processor of the receiver, for example. The rate of change of the phase drift used by the receiver to adaptively choose the number of groups may be estimated based on one or more characteristics of the receiver, such as characteristics known by the manufacturer of the receiver or components thereof, such as the reference oscillator or phase-locked loop (PLL) components. Furthermore, the rate of change of the phase drift may be estimated by the receiver dynamically during operation of the receiver. Flow proceeds to block 1804.

At block 1804, the receiver adapts the number of groups and size of each group using one or a combination of the information obtained at block 1802. Higher order modulation schemes (e.g., 16 QAM as compared to BPSK) require more data symbols, i.e., larger groups, to achieve the same estimation accuracy as lower order modulation schemes. The slower the phase drifts the more symbols can be comprised in a data part, i.e., the larger the groups may be, and the higher the estimation accuracy will be. The higher the signal to noise ratio, the smaller each group can be to achieve the same estimation accuracy. Flow ends at block 1804.

Figure 19:
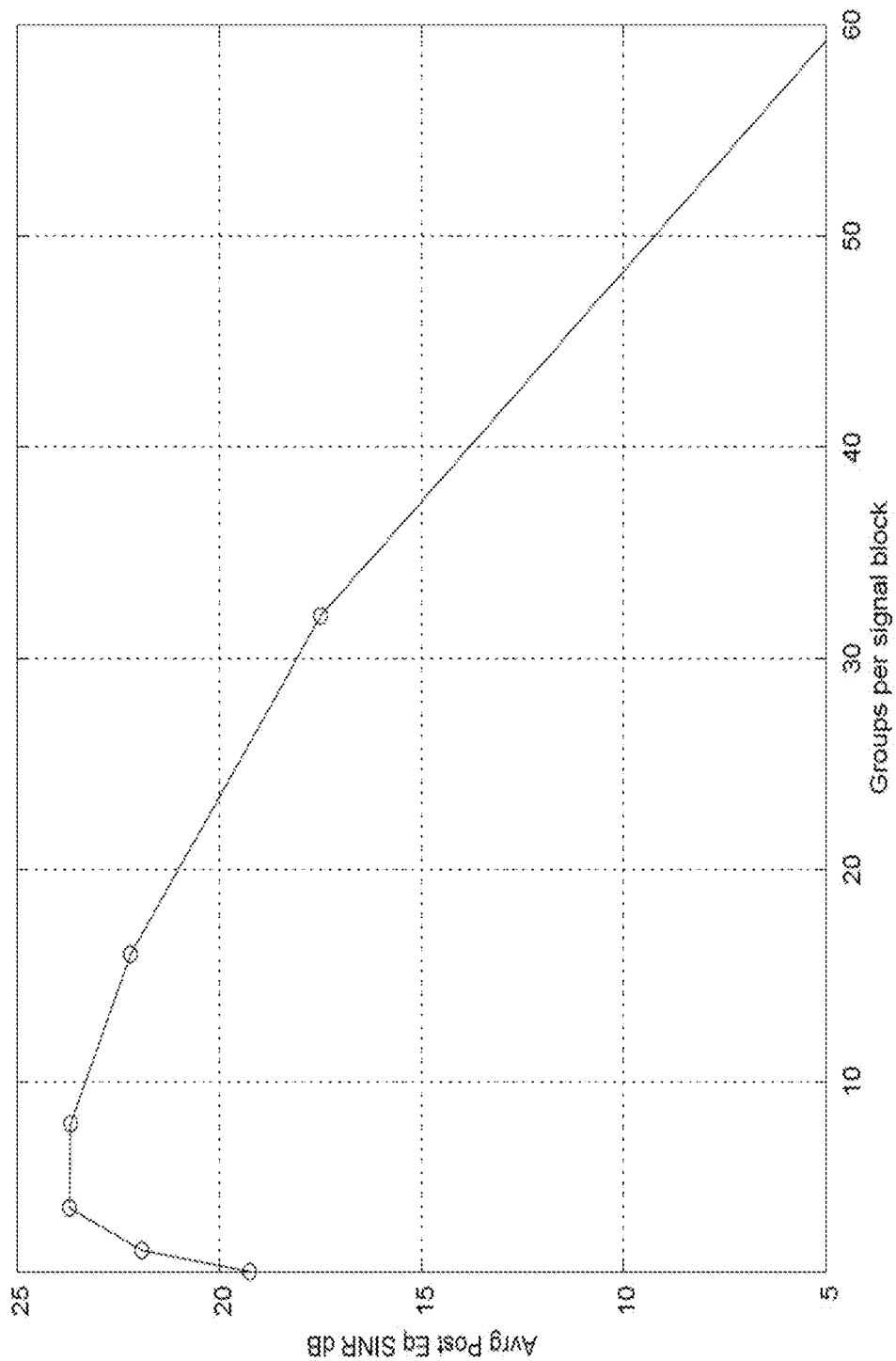
FIG. 19 is a graph illustrating an example of the impact of choosing different lengths of a group to perform post-equalization phase tracking.

Referring now to FIG. 19, a graph illustrating an example of the impact of choosing different lengths of a group to perform post-equalization phase tracking is shown. In the graph, the independent variable along the x-axis is the number of groups, having distinct values of one, two, four, eight, sixteen and 32. In the example, the signal block length is 512 symbols, and the first 32 symbols are pilot symbols. Thus, for example, when the number of groups is one, the number of equalized symbols per group is 512; when the number of groups is two, the number of equalized symbols per group is 256; when the number of groups is four, the number of equalized symbols per group is 128; when the number of groups is eight, the number of equalized symbols per group is 64; when the number of groups is sixteen, the number of equalized symbols per group is 32; and when the number of groups is thirty-two, the number of equalized symbols per group is 16. The dependent variable along the y-axis is the average signal-to-interference-and-noise ratio (SINR) in dB, which is measured at the output of the post-equalization phase tracking block 842. A curve has been fit to the points. The graph is the result of a simulation of post-equalization phase tracking as described herein, and includes a simulation phase noise model. The result does not include pre-equalization phase tracking, but instead only post-equalization phase tracking. The graph provides a comparison, for a system using 16 QAM modulation, a SNR of 20 dB, and an example phase drift characteristic, of the SINR when post-equalization phase tracking has been performed using the different number of groups selected as the dependent variable. It can be seen from the graph that four groups each of length 128 symbols would be optimal for the given modulation scheme, SNR and phase drift. The shape of the curve (i.e., how pronounced the optimal data part length is) depends on the modulation scheme, the SNR and the phase drift characteristics. Although an example with 16 QAM modulation is shown, other modulation schemes may be employed by the receiver and enjoy the benefits of the post-equalization phase tracking.

As described above with respect to FIG. 18, depending on the combination of the parameters of interest (e.g., SNR, modulation scheme, and phase drift rate of change), the receiver adaptively chooses the proper group length that maximizes phase tracking accuracy. A predetermined lookup table may be stored in the receiver that specifies group length and number of groups for different combinations of parameters. At block 1804, the receiver may look up the values obtained at block 1802 in the table to obtain the group length and number of groups for the obtained one or combination of parameters of interest.

Figure 20:
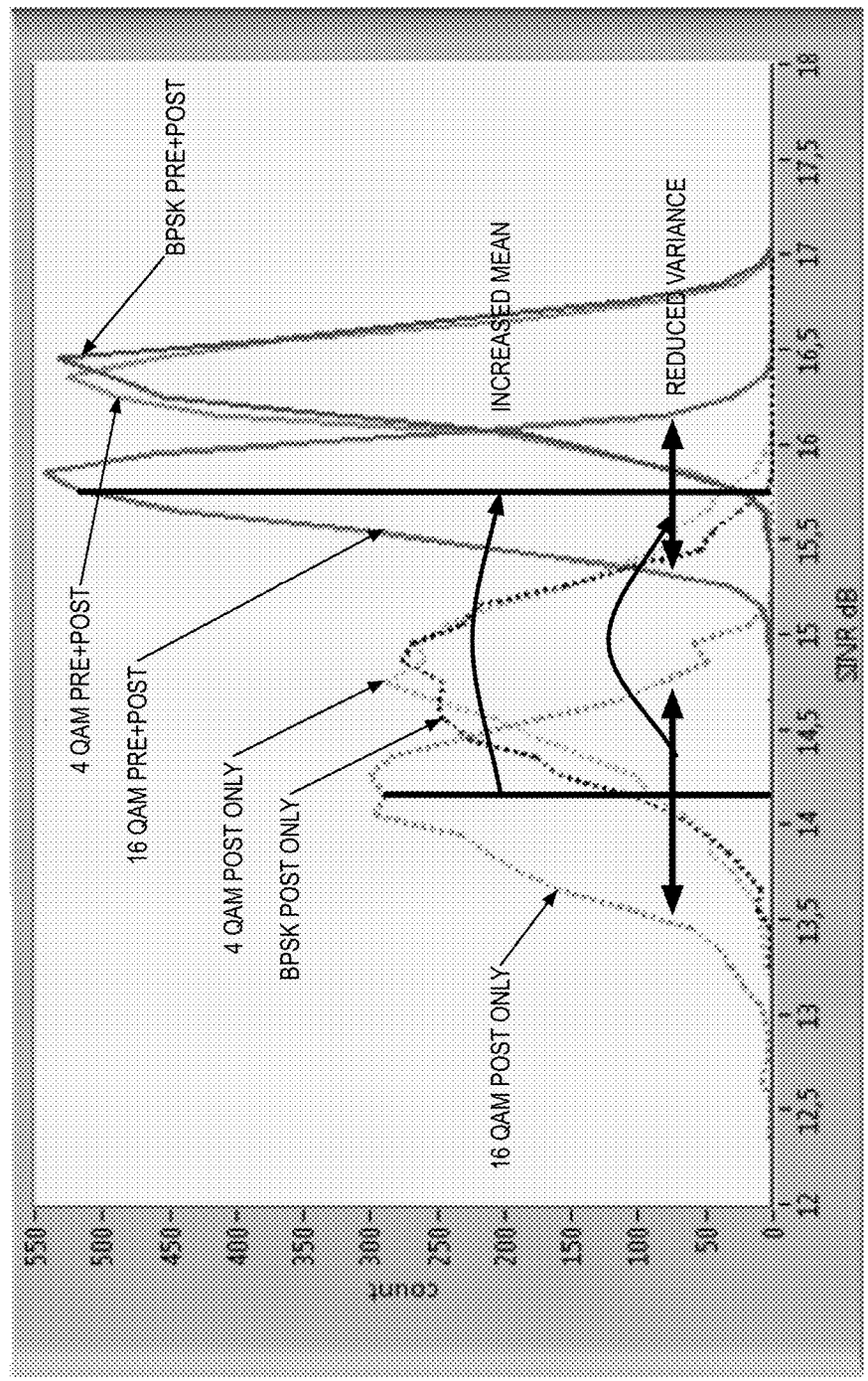
FIG. 20 is a graph illustrating measured performance results of pre-equalization phase tracking and post-equalization phase tracking.

Referring now to FIG. 20, a graph illustrating measured performance results of pre-equalization phase tracking and post-equalization phase tracking is shown. To obtain the results of FIG. 20, a single carrier signal, where pilot symbols precede the signal block, has been transmitted over the air at 60 GHz. The transmission scenario was completely static. FIG. 20 represents average behavior obtained by evaluating multiple slots. The graph provides a comparison of the distribution of the SINR for two cases. In the case of the dashed line curves, only post-equalization phase tracking has been applied; whereas, in the case of the solid line curves, both pre-equalization phase tracking and post-equalization phase tracking have been applied. Note that the SINR variance is caused by phase noise. The average SINR improves significantly, by about 1.5 dB, when both pre-equalization and post-equalization phase tracking have been applied. Advantageously, this may enable transmission at higher data rates. Furthermore, the SINR distribution is narrower: standard deviation decreases by a factor of 2 in the example. Advantageously, this may allow more accurate prediction of the link quality and assignment of data rates. Finally, advantageously, the transmission may be more robust and less prone to error.

Figure 21:
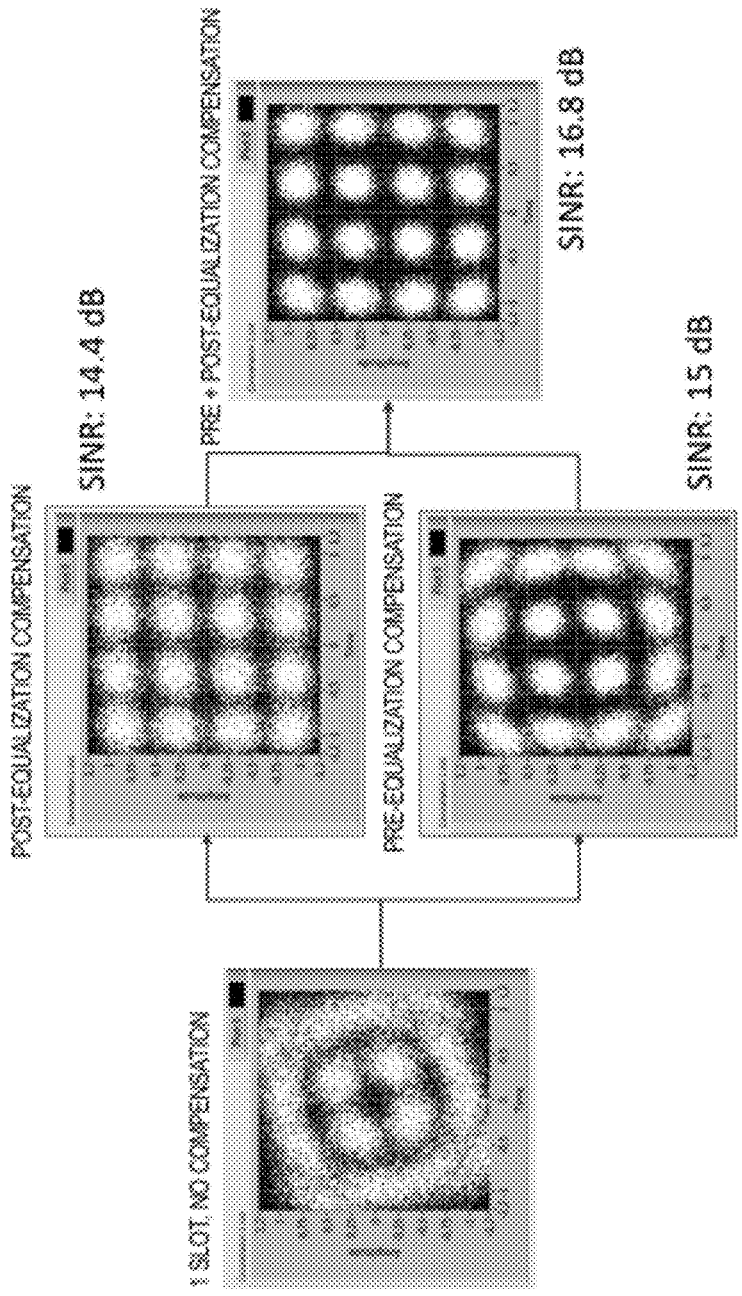
FIG. 21 is a collection of constellation diagrams illustrating measured performance results of pre-equalization phase tracking and post-equalization phase tracking according to described embodiments.

Referring now to FIG. 21, constellation diagrams illustrating measured performance results of pre-equalization phase tracking and post-equalization phase tracking according to described embodiments is shown. The first constellation diagram (far left) was obtained for one slot without the application of phase tracking. The second constellation diagram (middle bottom) was obtained with the application of pre-equalization phase tracking, and the third constellation diagram (middle top) was obtained with the application of post-equalization phase tracking. Each shows an improvement in signal quality, in different degree and manner, particularly with respect to residual phase error and post-equalization noise variance. The fourth constellation diagram (far right) was obtained with the application of both pre-equalization phase tracking and post-equalization phase tracking, showing an even greater improvement in signal quality, including an improvement in SINR relative to the application of only pre-equalization phase tracking or post-equalization phase tracking. Generally, it may be observed that the isolated use of pre-equalization phase tracking may advantageously result in a significant improvement of the signal quality, and the isolated use of post-equalization phase tracking individually may advantageously result in a significant improvement of the signal quality, and the combination of pre-equalization phase tracking and post-equalization phase tracking may advantageously result in an even more significant improvement of the signal quality.

Figure 22:
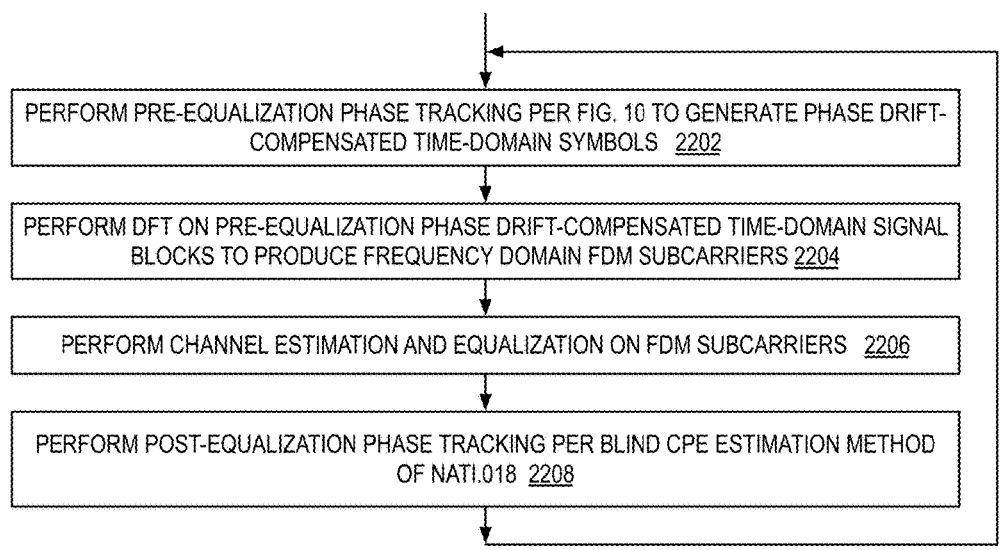
FIG. 22 is a flowchart illustrating operation of a wireless receiver to perform the combination of pre-equalization phase tracking and post-equalization phase tracking on FDM signal blocks.

Referring now to FIG. 22, a flowchart illustrating operation of a wireless receiver to perform the combination of pre-equalization phase tracking and post-equalization phase tracking on FDM signal blocks is shown. Flow begins at block 2202.

At block 2202, the receiver performs pre-equalization phase tracking (e.g., pre-equalization phase tracking block 822 of FIG. 8) according to the method described above with respect to FIG. 10 to generate phase drift-compensated time-domain symbols, e.g., symbols 894 of FIG. 8. Preferably, the receiver uses an embodiment directed to a transmission scheme that employs cyclic prefixes, for example as are commonly used in OFDM systems, e.g., as in FIG. 14. Flow proceeds to block 2204.

At block 2204, the receiver performs a DFT (e.g., FFT 832 of FIG. 8) on the phase drift-compensated time-domain signal block to produce frequency domain FDM subcarriers. Flow proceeds to block 2206.

At block 2206, the receiver performs channel estimation and equalization (e.g., channel estimation block 834 and equalization block 836) on the FDM subcarriers. Flow proceeds to block 2208.

At block 2208, the receiver performs post-equalization phase tracking (e.g., post-equalization phase tracking block 842 of FIG. 8) on the FDM subcarriers according to a blind common phase error (CPE) compensation method described in U.S. patent application Ser. No. 15/855,148, filed Dec. 27, 2017, which is hereby incorporated by reference in its entirety for all purposes. More specifically, the receiver subdivides a constellation diagram into two or more regions. The constellation diagram is associated with a modulation scheme used by a transmitter to generate the FDM data subcarriers of the FDM symbol that was transmitted by the transmitter. After the equalization, for each signal block of the series, and for each region of the regions, the receiver extracts a subset of the equalized FDM data subcarriers that fall within the region and computes a respective region-specific CPE estimate on the subset of equalized FDM data subcarriers that fall within the region. The receiver then averages the respective region-specific CPE estimates to produce an overall CPE estimate. The receiver then compensates each of the equalized FDM data subcarriers using the overall CPE estimate. More specifically, to compute a respective region-specific CPE estimate on the subset of equalized FDM data subcarriers that fall within the region, the receiver fits a line to the extracted subset of the equalized FDM data subcarriers that fall within the region, computes an angle between the fitted line and a phase noise absence line associated with the region, and assigns the respective region-specific CPE estimate with the computed angle. The receiver subdivides the constellation diagram into regions by subdividing the constellation diagram into two or more vertical regions defined by one or more thresholds of complex FDM data subcarrier real component values and/or two or more horizontal regions defined by one or more thresholds of complex FDM data subcarrier imaginary component values. Flow returns to block 2202 to process the next signal block in the series.

In one aspect, the wireless radio receiver estimates and compensates for phase drift in a series of frequency division multiplexed (FDM) signal blocks received from a channel. Each signal block of the series comprises a collection of data symbols. The receiver includes a pre-equalization phase tracking unit. Prior to channel estimation and equalization, for each signal block of the series of signal blocks, the pre-equalization phase tracking unit: computes an autocorrelation between a terminal portion of the signal block and its corresponding repeated portion in a cyclic prefix preceding the signal block and computing a phase of the autocorrelation, estimates a start phase of a first symbol within a block processing window associated with the signal block using the computed phase of the autocorrelation and the start phase of the first symbol within the block processing window associated with the previous signal block in the series, estimates a phase drift within the block processing window by interpolating using the estimated start phases of the first symbol within the block processing windows associated with at least the signal block and the next signal block in the series, and computes a phase compensation signal using the estimated phase drift within the block processing window and compensates for the estimated phase drift using the computed phase compensation signal. The receiver also transforms the FDM signal blocks into FDM data subcarriers and performs channel estimation and equalization of the FDM data subcarriers using the channel estimation and subdivides a constellation diagram into two or more regions. The constellation diagram is associated with a modulation scheme used by a transmitter to generate the FDM data subcarriers of the FDM symbol that was transmitted by the transmitter. The receiver also includes a post-equalization phase tracking unit. The post-equalization tracking unit includes an FDM symbol-based CPE estimator that, for each signal block of the series of signal blocks: for each region of the regions, extracts a subset of the equalized FDM data subcarriers that fall within the region and computes a respective region-specific CPE estimate on the subset of equalized FDM data subcarriers that fall within the region. The CPE estimator also averages the respective region-specific CPE estimates for the regions to produce an overall CPE estimate. The post-equalization tracking unit also include a CPE compensator that compensates each of the equalized FDM data subcarriers using the overall CPE estimate. In one embodiment, to compute a respective region-specific CPE estimate on the subset of equalized FDM data subcarriers that fall within the region, the CPE estimator fits a line to the extracted subset of the equalized FDM data subcarriers that fall within the region and computes an angle between the fitted line and a phase noise absence line associated with the region and assigning the respective region-specific CPE estimate with the computed angle. In one embodiment, the subdivided constellation diagram is subdivided into two or more vertical regions defined by one or more thresholds of complex FDM data subcarrier real component values and/or two or more horizontal regions defined by one or more thresholds of complex FDM data subcarrier imaginary component values. In one embodiment, a series of the FDM symbols is received. For each FDM symbol of the FDM symbols in the series: the CPE compensator compensates the equalized FDM data subcarriers of the FDM symbol using the accumulated CPE estimate, the CPE estimator computes the overall CPE estimate of the FDM symbol, the CPE compensator compensates the compensated equalized FDM data subcarriers of the FDM symbol using the computed overall CPE estimate of the FDM symbol, and an accumulator updates the accumulated CPE estimate using the computed overall CPE estimate of the FDM symbol. In one embodiment, the CPE estimator initializes the accumulated CPE estimate to zero. In one embodiment, the CPE estimator initializes the accumulated CPE estimate to a CPE estimate computed using pilot symbols embedded in an FDM symbol preceding the series of FDM symbols, and the wireless base station or user equipment that includes the receiver sends, to the transmitter of another wireless base station or user equipment, control messages that indicate a CPE compensation performance level to enable the other transmitter to adapt a density in time and/or frequency of embedded pilot symbols within subsequently transmitted FDM symbols in response to the control messages received from the receiver. In one embodiment, the CPE estimator, rather than fitting the line, computes CPE estimates using a power law method.

It is noted that the techniques described herein can be used for massive MIMO (multiple input, multiple output) cellular telecommunication systems such as those described in U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety. It is further noted that different and/or additional features can also be implemented, as desired, and related systems and methods can be utilized as well. Such massive MIMO communication systems can be used for 5G dynamic TDD (time division duplex) air interfaces. The 5G ($5^{th}$ generation) mobile telecommunications system is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new phase tracking described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for teaching those skilled in the art the manner of carrying out the invention. It is to be understood that the forms of the invention herein shown and described are to be taken as present embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A wireless radio receiver that estimates and compensates for phase drift in a series of signal blocks received from a wireless channel, comprising:
   a post-equalization phase tracking unit configured to, for each signal block of the series of signal blocks:
      compute an absolute phase rotation at the beginning of the signal block using an equalized version of pilot symbols preceding the signal block;
      subdivide the signal block into a time sequence of groups of equalized modulated data symbols;
      initialize an accumulated phase associated with the first-in-time group of the time sequence of groups with the computed absolute phase rotation; and
      for each group of the time sequence of groups in time sequential order, wherein the group has an associated previous group in the time sequence of groups:
         compute a de-rotated version of each equalized modulated data symbol within the group using the accumulated phase associated with the previous group;
         blindly estimate a residual phase within the group using the de-rotated version of the equalized modulated data symbols within the group;
         assign the accumulated phase associated with the group with a sum of the blindly estimated residual phase within the group and the accumulated phase associated with the previous group;

estimate phase drift within the group by using at least the accumulated phase associated with the group; and compute a phase compensation signal for the group using the estimated phase drift within the group and compensate for phase drift on each equalized modulated data symbol within the group using the computed phase compensation signal.

2. The receiver of claim 1, wherein to subdivide the signal block into the time sequence of groups of equalized modulated data symbols, the post-equalization phase tracking unit subdivides the signal block into N groups, wherein N is an integer greater than one; and wherein the receiver adaptively chooses N based on one or a combination of the following list of factors:

a signal to noise ratio associated with the received series of signal blocks;

a modulation scheme used by a transmitter to generate the modulated data symbols of the signal blocks; and a rate of change of the phase drift.

3. The receiver of claim 1, wherein to estimate phase drift within the group by using at least the accumulated phase associated with the group, the post-equalization phase tracking unit interpolates in a constant fashion using the assigned accumulated phase associated with the group.

4. The receiver of claim 1, wherein to estimate phase drift within the group by using at least the accumulated phase associated with the group, the post-equalization phase tracking unit interpolates in a linear fashion using the assigned accumulated phases associated with the group and the previous group in the time sequence and interpolates in a linear fashion using the assigned accumulated phases associated with the group and the next group in the time sequence.

5. The receiver of claim 1, wherein to estimate phase drift within the group by using at least the accumulated phase associated with the group, the post-equalization phase tracking unit interpolates in a polynomial fashion using the assigned accumulated phases associated with the group and at least two additional groups in the time sequence.

6. The receiver of claim 1, wherein to compute the absolute phase rotation at the beginning of the signal block using the equalized version of pilot symbols preceding the signal block, the post-equalization phase tracking unit computes a cross-correlation between the equalized version of the pilot symbols and known values of the pilot symbols transmitted by a transmitter.

7. The receiver of claim 1, further comprising:

wherein each signal block of the series of signal blocks comprises a collection of data symbols, wherein an initial signal sequence and a terminal signal sequence are associated with each signal block of the series of signal blocks, wherein the initial and terminal signal sequences of each signal block are identical as transmitted by a transmitter, wherein the initial signal sequence either immediately precedes the signal block or comprises an initial portion of the data symbols of the signal block, wherein the terminal signal sequence either immediately follows the signal block or comprises a terminal portion of the data symbols of the signal block;

a pre-equalization phase tracking unit, wherein for each signal block of the series of signal blocks, the pre-equalization phase tracking unit:

computes an autocorrelation between a portion of the initial and terminal sequences associated with the signal block and computing a phase of the autocorrelation;

estimates a start phase of a first symbol within a block processing window associated with the signal block using the computed phase of the autocorrelation and the start phase of the first symbol within the block processing window associated with the previous signal block in the series of signal blocks;

estimates a phase drift within the block processing window by interpolating using the estimated start phases of the first symbol within the block processing windows associated with at least the signal block and the next signal block in the series of signal blocks; and computes a phase compensation signal using the estimated phase drift within the block processing window and compensates for the estimated phase drift using the computed phase compensation signal.

8. The receiver of claim 7, wherein the pre-equalization phase tracking unit computes an autocorrelation, estimates a start phase, estimates a phase drift, and computes a phase compensation signal before channel estimation and equalization of the signal block.

9. The receiver of claim 7, wherein the portion of the initial and terminal signal sequences have a length;

wherein the receiver adaptively chooses the length of the portion using one or a combination of the following list:

a signal to noise ratio associated with the received series of signal blocks; and one or more estimated characteristics of the wireless channel.

10. The receiver of claim 9, wherein the one or more estimated characteristics of the wireless channel are one or a combination of the list comprising:

a length of the impulse response of the channel;

a delay spread of the channel; and a power delay profile of the channel.

11. A method for a wireless radio receiver to estimate and compensate for phase drift in a series of signal blocks received from a wireless channel, the method comprising:

for each signal block of the series of signal blocks:

computing an absolute phase rotation at the beginning of the signal block using an equalized version of pilot symbols preceding the signal block;

subdividing the signal block into a time sequence of groups of equalized modulated data symbols;

initializing an accumulated phase associated with the first-in-time group of the time sequence of groups with the computed absolute phase rotation; and for each group of the time sequence of groups in time sequential order, wherein the group has an associated previous group in the time sequence of groups:

computing a de-rotated version of each equalized modulated data symbol within the group using the accumulated phase associated with the previous group;

blindly estimating a residual phase within the group using the de-rotated version of the equalized modulated data symbols within the group;

assigning the accumulated phase associated with the group with a sum of the blindly estimated residual phase within the group and the accumulated phase associated with the previous group;

estimating phase drift within the group by using at least the accumulated phase associated with the group; and computing a phase compensation signal for the group using the estimated phase drift within the group and compensating for phase drift on each equalized modulated data symbol within the group using the computed phase compensation signal.

12. The method of claim 11,
wherein said subdividing the signal block into the time sequence of groups of equalized modulated data symbols comprises subdividing the signal block into N groups, wherein N is an integer greater than one; and
wherein the receiver adaptively chooses N based on one or a combination of the following list of factors:
a signal to noise ratio associated with the received series of signal blocks;
a modulation scheme used by a transmitter to generate the modulated data symbols of the signal blocks; and
a rate of change of the phase drift.

13. The method of claim 11,
wherein said estimating phase drift within the group by using at least the accumulated phase associated with the group comprises interpolating in a constant fashion using the assigned accumulated phase associated with the group.

14. The method of claim 11,
wherein said estimating phase drift within the group by using at least the accumulated phase associated with the group comprises interpolating in a linear fashion using the assigned accumulated phases associated with the group and the previous group in the time sequence and interpolating in a linear fashion using the assigned accumulated phases associated with the group and the next group in the time sequence.

15. The method of claim 11,
wherein said estimating phase drift within the group by using at least the accumulated phase associated with the group comprises interpolating in a polynomial fashion using the assigned accumulated phases associated with the group and at least two additional groups in the time sequence.

16. The method of claim 11,
wherein said computing the absolute phase rotation at the beginning of the signal block using the equalized version of pilot symbols preceding the signal block comprises computing a cross-correlation between the equalized version of the pilot symbols and known values of the pilot symbols transmitted by a transmitter.

17. The method of claim 11, further comprising:
wherein each signal block of the series of signal blocks comprises a collection of data symbols, wherein an initial signal sequence and a terminal signal sequence are associated with each signal block of the series of signal blocks, wherein the initial and terminal signal sequences of each signal block are identical as transmitted by a transmitter, wherein the initial signal sequence either immediately precedes the signal block or comprises an initial portion of the data symbols of the signal block, wherein the terminal signal sequence either immediately follows the signal block or comprises a terminal portion of the data symbols of the signal block;

for each signal block of the series of signal blocks:
computing an autocorrelation between a portion of the initial and terminal sequences associated with the signal block and computing a phase of the autocorrelation;

estimating a start phase of a first symbol within a block processing window associated with the signal block using the computed phase of the autocorrelation and the start phase of the first symbol within the block processing window associated with the previous signal block in the series of signal blocks;

estimating a phase drift within the block processing window by interpolating using the estimated start phases of the first symbol within the block processing windows associated with at least the signal block and the next signal block in the series of signal blocks; and computing a phase compensation signal using the estimated phase drift within the block processing window and compensating for the estimated phase drift using the computed phase compensation signal.

18. The method of claim 17,
wherein said computing an autocorrelation, said estimating a start phase, said estimating a phase drift, and said computing a phase compensation signal are performed before channel estimation and equalization of the signal block.

19. The method of claim 17,
wherein the portion of the initial and terminal signal sequences have a length;
wherein the receiver adaptively chooses the length of the portion using one or a combination of the following list:
a signal to noise ratio associated with the received series of signal blocks; and
one or more estimated characteristics of the wireless channel.

20. The method of claim 19,
wherein the one or more estimated characteristics of the wireless channel are one or a combination of the list comprising:
a length of the impulse response of the channel;
a delay spread of the channel; and
a power delay profile of the channel.

21. A non-transitory computer-readable medium embedded with instructions executed by a processor of a wireless radio receiver to perform operations to estimate and compensate for phase drift in a series of signal blocks received from a wireless channel, the operations comprising:
for each signal block of the series of signal blocks:
compute an absolute phase rotation at the beginning of the signal block using an equalized version of pilot symbols preceding the signal block;
subdivide the signal block into a time sequence of groups of equalized modulated data symbols;
initialize an accumulated phase associated with the first-in-time group of the time sequence of groups with the computed absolute phase rotation; and for each group of the time sequence of groups in time sequential order, wherein the group has an associated previous group in the time sequence of groups:
compute a de-rotated version of each equalized modulated data symbol within the group using the accumulated phase associated with the previous group;
blindly estimate a residual phase within the group using the de-rotated version of the equalized modulated data symbols within the group;
assign the accumulated phase associated with the group with a sum of the blindly estimated residual phase within the group and the accumulated phase associated with the previous group;
estimate phase drift within the group by using at least the accumulated phase associated with the group; and
compute a phase compensation signal for the group using the estimated phase drift within the group and compensating for phase drift on each equalized modulated data symbol within the group using the computed phase compensation signal.

* * * * *